(12) United States Patent
Song et al.

(10) Patent No.: US 12,730,550 B2
(45) Date of Patent: Sep. 8, 2026

(54) CONTENT-BASED APPLICATION EXECUTION METHOD AND APPARATUS

(71) Applicant: SAMSUNG ELECTRONICS CO., LTD., Suwon-si (KR)

(72) Inventors: Taeyang Song, Suwon-si (KR); Dahee Kim, Suwon-si (KR); Teayoung Kim, Suwon-si (KR); Sunghwan Park, Suwon-si (KR); Changhan Lee, Suwon-si (KR); Jihea Park, Suwon-si (KR); Yangwook Kim, Suwon-si (KR); Myunghoon Kwak, Suwon-si (KR); Jookwan Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 170 days.

(21) Appl. No.: 18/754,686

(22) Filed: Jun. 26, 2024

(65) Prior Publication Data

US 2024/0345711 A1 Oct. 17, 2024

Related U.S. Application Data

(63) Continuation of application No. PCT/KR2022/018542, filed on Nov. 23, 2022.

(30) Foreign Application Priority Data

Jan. 6, 2022 (KR) ........................ 10-2022-0002143
Feb. 3, 2022 (KR) ........................ 10-2022-0013958

(51) Int. Cl.
*G06F 3/048* (2013.01)
*G06F 3/0481* (2022.01)
(Continued)

(52) U.S. Cl.
CPC .......... *G06F 3/0484* (2013.01); *G06F 3/0481* (2013.01); *H04M 1/72403* (2021.01); *H04M 1/72469* (2021.01); *G06F 1/1652* (2013.01)

(58) Field of Classification Search
CPC .... G06F 3/0484; G06F 3/0481; G06F 1/1652; H04M 1/72469; H04M 1/72403
See application file for complete search history.

(56) References Cited

U.S. PATENT DOCUMENTS 11,036,257 B2 * 6/2021 Kim .................... H04M 1/0268
2016/0182709 A1 * 6/2016 Kim ........................ H04W 4/14 455/466
(Continued)

FOREIGN PATENT DOCUMENTS

KR 101345500 B1 12/2013
KR 101693690 B1 1/2017
(Continued)

OTHER PUBLICATIONS

Korean Office Action for Korean Application No. 10-2022-0013958; Report Mail Date Apr. 10, 2026 (14 ages—with English Translation).

*Primary Examiner* — Haoshian Shih
(74) *Attorney, Agent, or Firm* — CANTOR COLBURN LLP

(57) ABSTRACT

A shape-changeable electronic apparatus according to an embodiment includes: a display module having a first area and a second area. In response to the shape of the electronic apparatus being a first shape, the first area is activated, and in response to the shape of the electronic apparatus being a second shape, the second area is activated. The electronic apparatus further includes a memory storing computer-executable instructions and a processor which executes the instructions. When the instructions are executed, in the first shape, first content related to a first application is displayed
(Continued)

in the first area. Information is identified from the first content. The presence of a candidate application to which the identified information can be applied is determined. In response to the candidate application being present, a graphic object capable of receiving an input for changing the shape of the electronic apparatus is displayed on the first area.

15 Claims, 25 Drawing Sheets

(51) Int. Cl.
*G06F 3/0484* (2022.01)
*H04M 1/72403* (2021.01)
*H04M 1/72469* (2021.01)
*G06F 1/16* (2006.01)

(56) References Cited

U.S. PATENT DOCUMENTS

2016/0349971 A1* 12/2016 Chi .................... G09G 5/373
2017/0011714 A1* 1/2017 Eim .................... G06F 1/1677
2019/0012008 A1* 1/2019 Yoon .................... G06F 1/1652
2022/0066602 A1* 3/2022 Park .................... G06F 3/04886
2022/0365562 A1* 11/2022 Ahn .................... G06F 1/1624

FOREIGN PATENT DOCUMENTS

KR 101701952 B1 2/2017
KR 20170024942 A 3/2017
KR 20170048007 A 5/2017
KR 20170079549 A 7/2017
KR 20170082369 A 7/2017
KR 20170084586 A 7/2017
KR 101799044 B1 12/2017
KR 102014791 B1 10/2019
KR 102256292 B1 5/2021
KR 102289412 B1 8/2021

* cited by examiner

CONTENT-BASED APPLICATION EXECUTION METHOD AND APPARATUS

This application claims priority to International Application No. PCT/KR2022/018542, filed Nov. 23, 2022, which claims priority to Korean Patent Application No. 10-2022-0002143, filed Jan. 6, 2022, and Korean Patent Application No. 10-2022-0013958, filed Feb. 3, 2022, and all the benefits accruing therefrom under 35 U.S.C. § 119, the contents of which in their entirety are herein incorporated by reference.

BACKGROUND

The following disclosure relates to technology for executing an application based on content.

Users perform various tasks, such as note-taking, emails, text messages, web searches, online banking, and more, on electronic devices (e.g., portable smart devices). It is common to execute multiple applications at the same time or one after another for a single purpose. In particular, notes, emails, and text messages often contain information that may be used in different applications. Therefore, it is common to check notes, text messages, or emails while using a predetermined application to find needed information. For example, when someone wants to transfer money to an account in a note or text message on their device, it used to be a bit cumbersome. The user had to remember, jot down, or copy the account number to a clipboard, then go back to the home screen, locate and open a banking application, and finally input the account number to the banking application.

SUMMARY

Technical Goals

An electronic device may execute one application and display content related to the executed application. To additionally execute other applications related to the content displayed on a display, the electronic device may require a user to undergo the cumbersome process of manually finding and executing each application related to the displayed content after closing the currently executed application.

According to an embodiment, an electronic device may identify information from first content related to a first application displayed in a screen area, select a second application to which the identified information is applied, and additionally display, in the screen area, second content displaying the identified information applied to the second application.

According to an embodiment, when receiving a user input selecting a graphic object, the electronic device may display, in an extended screen area of the electronic device, the second content displaying the identified information applied to the second application.

According to an embodiment, an electronic device that is transformable may include a display module including a first area and a second area, wherein the first area is activated when a shape of the electronic device is a first shape and the second area is activated when the shape of the electronic device is a second shape, a processor, and a memory connected electrically to the processor and configured to store computer-readable instructions executable by the processor, wherein the computer-executable instructions, when executed, cause the electronic device to, in response to the electronic device being in the first shape, display first content related to a first application in the first area, identify information from the first content, determine whether there is at least one candidate application to which the identified information is applicable, and in response to determining that there is the at least one candidate application to which the identified information is applicable, display, in the first area, a first graphic object that is capable of receiving input for changing the shape of the electronic device from the first shape to the second shape.

A method, implemented by a processor, may include activating a first area in response to a shape of an electronic device being a first shape and activating a second area in response to the shape of the electronic device being a second shape, in response to the electronic device being in the first shape, displaying first content related to a first application in the first area, identifying information from the first content, determining whether there is at least one candidate application to which the identified information is applicable, and in response to determining that there is the at least one candidate application to which the identified information is applicable, displaying, in the first area, a first graphic object that is capable of receiving input for changing the shape of the electronic device from the first shape to the second shape.

Effects

According to an embodiment, an electronic device may recommend at least one candidate application to which information identified in first content may be applied to a user.

According to an embodiment, the electronic device may automatically apply the information identified in the first content to a second application without manual input by the user, thereby increasing user convenience.

According to an embodiment, the electronic device may display, in a first area, a graphic object that may receive input for executing the second application to which the information identified in the first content is applied and provide the user with authorization to apply the identified information to the second application by applying the identified information to the second application based on a user input selecting the graphic object.

According to an embodiment, the electronic device may identify information from partial content displayed in a partial area of the first content displayed in the first area, wherein the partial area is designated based on a user input, thereby increasing the text recognition rate of the electronic device and reducing computational workload of the electronic device.

DETAILED DESCRIPTION

Figure 1:
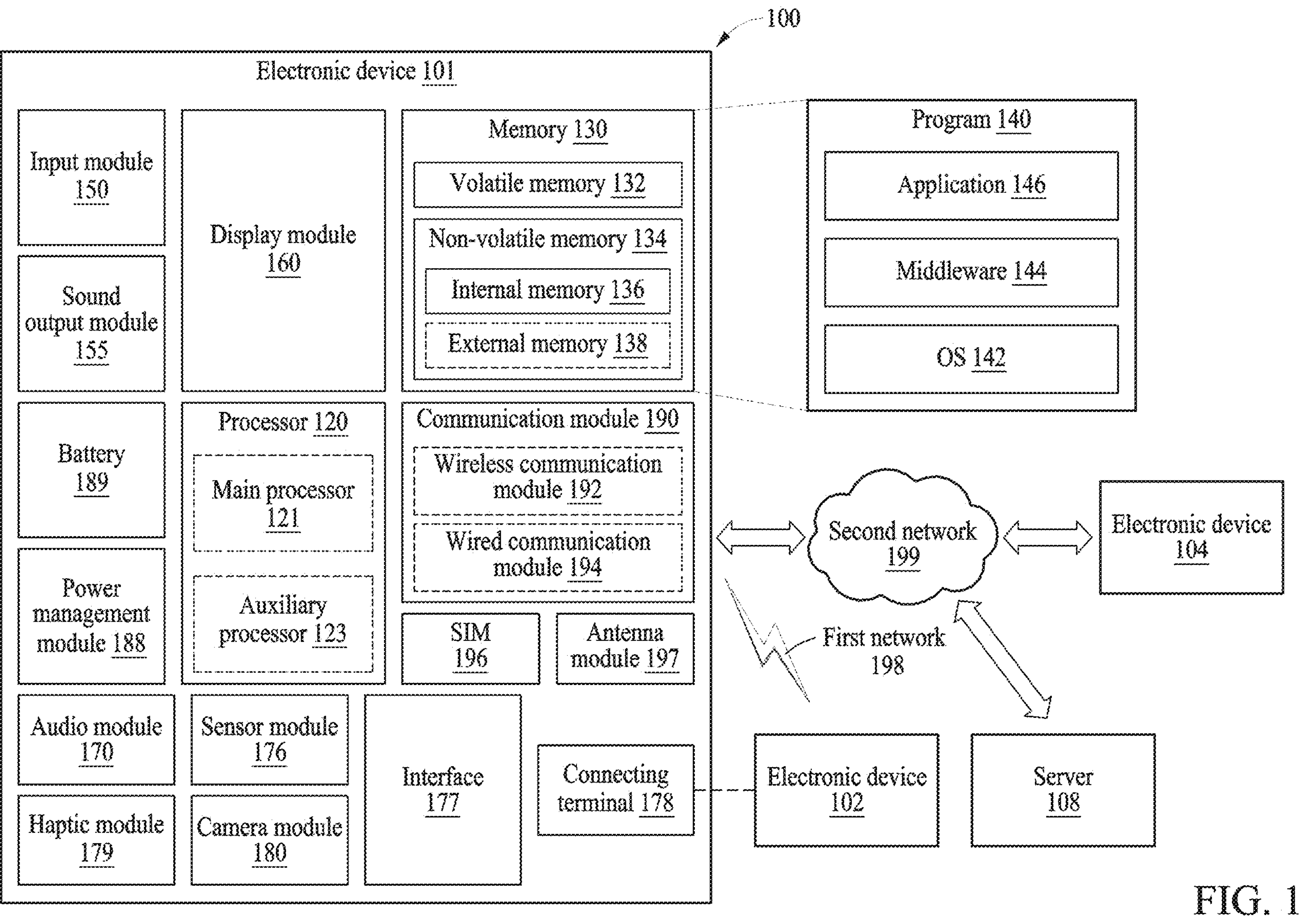
FIG. 1 is a block diagram of an electronic device in a network environment according to various embodiments.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network) or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added to the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for processing of an artificial intelligence (AI) model. An AI model may be generated by machine learning. Such learning may be performed by, for example, the electronic device 101 in which an AI model is executed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store a variety of data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and a control circuit to control a corresponding one of the display, the hologram device, and the projector. According to an embodiment, the display module 160 may include a touch sensor adapted to detect a touch, or a pressure sensor adapted to measure the intensity of force incurred by the touch.

The audio module 170 may convert a sound into an electric signal and vice versa. According to an embodiment, the audio module 170 may obtain the sound via the input module 150, or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101 and may generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196. For reference, the communication module may establish communication with a target device (e.g., the electronic device 104) for mirroring display.

The wireless communication module 192 may support a fifth generation (5G) network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. The external electronic device 104 may be a target device with a target display that may output an image. In another embodiment, the external electronic device (e.g., the electronic device 104) may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
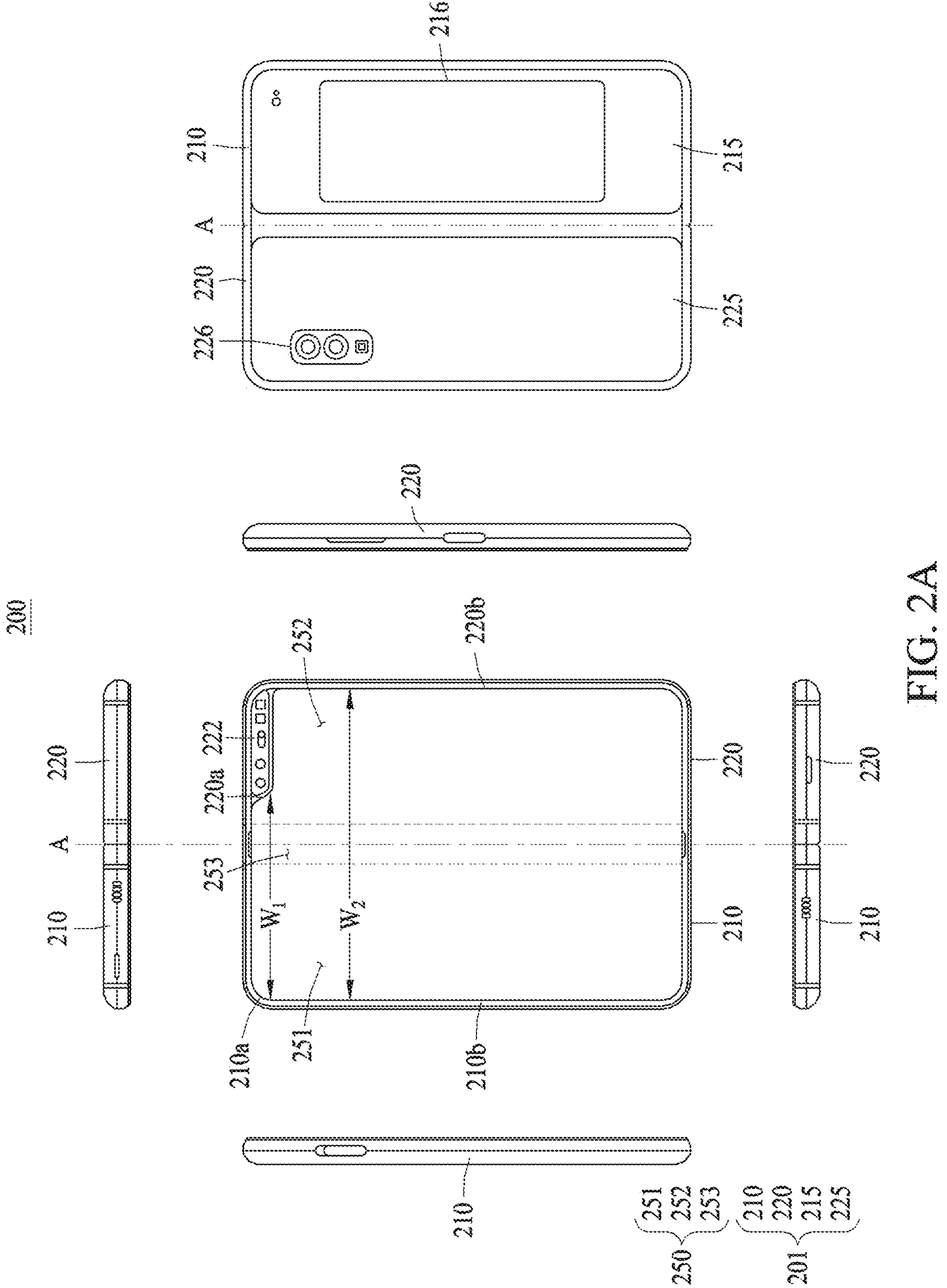
FIG. 2A is a diagram illustrating a flat state of an electronic device according to various embodiments.
Figure 2B:
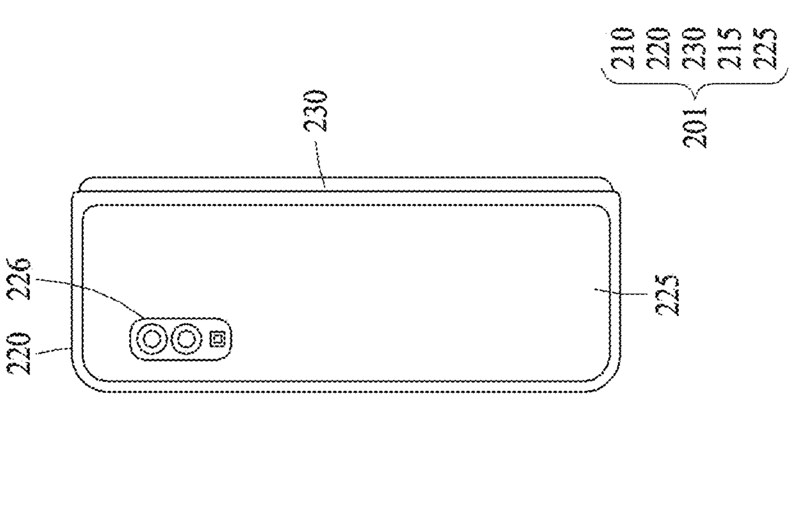
FIG. 2B is a diagram illustrating a folded state of the electronic device according to various embodiments.
Figure 2B:
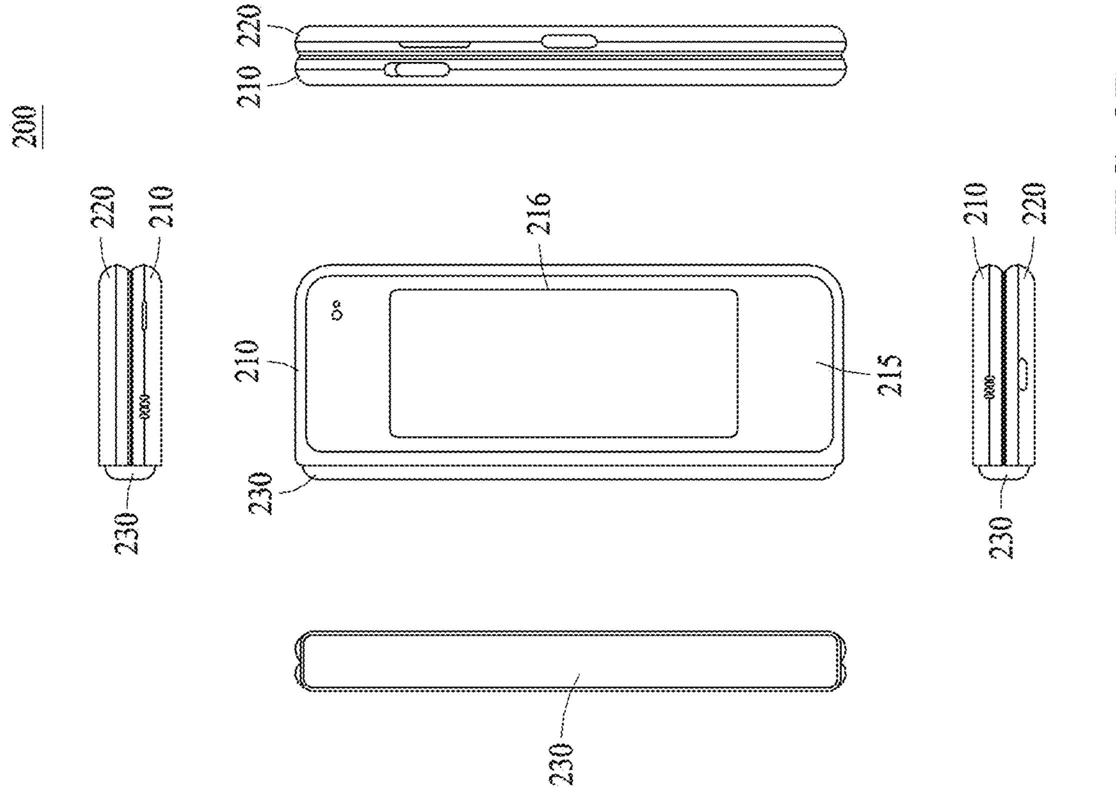
Figure 2C:
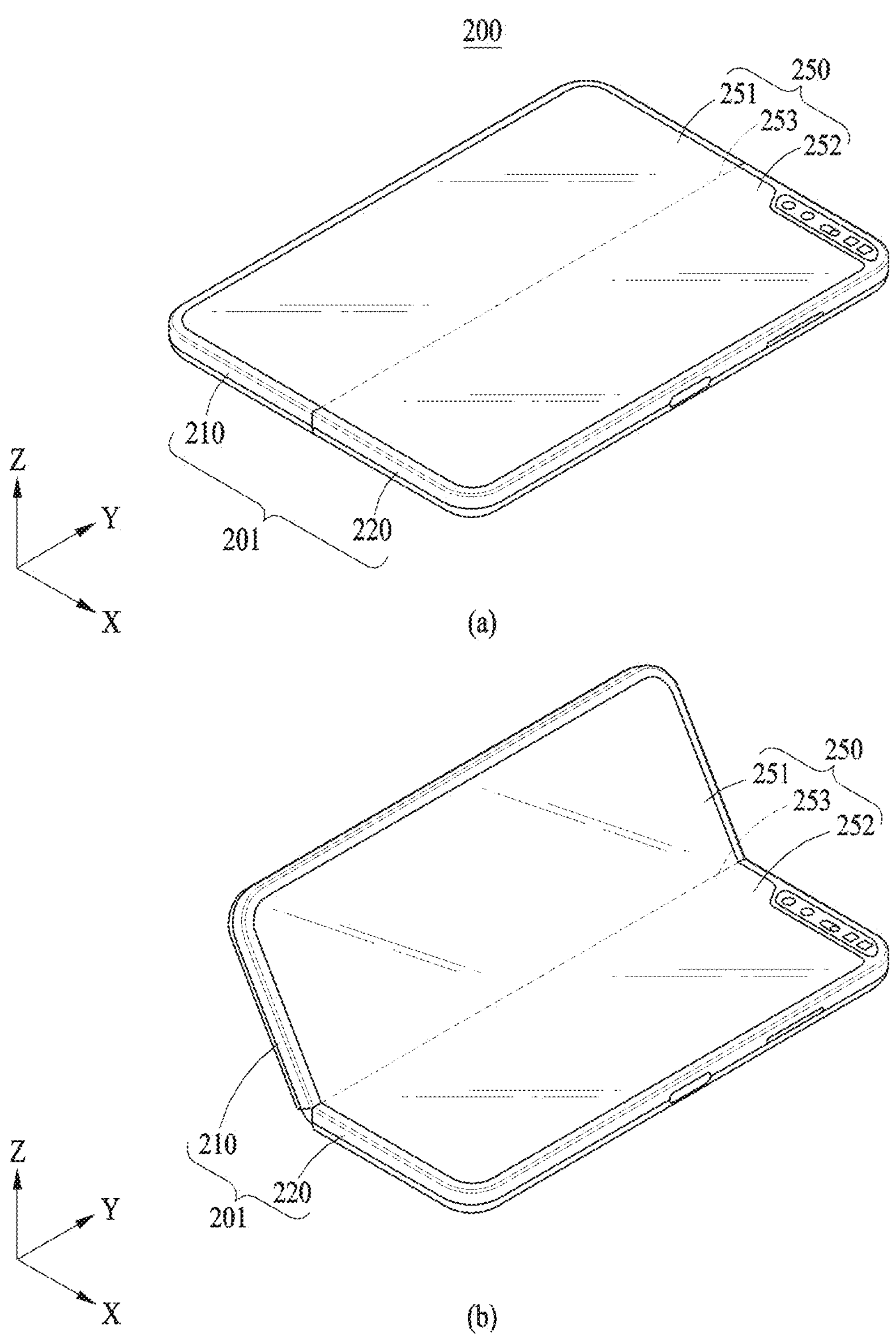
FIG. 2C is a perspective view illustrating an example of a full-flat state or an intermediate state of the electronic device according to various embodiments.

FIG. 2A is a diagram illustrating a flat state of an electronic device 200 according to various embodiments of the present disclosure. FIG. 2B is a diagram illustrating a folded state of the electronic device 200 various embodiments of the present disclosure. FIG. 2C is a perspective view illustrating an example of a full-flat state or a partially unfolded intermediate state of the electronic device 200 various embodiments of the present disclosure.

The electronic device 200 of FIGS. 2A through 2C is an example of the electronic device 101 of FIG. 1 and may be a foldable or bendable electronic device.

In FIG. 2C and the other following drawings, illustrated is a spatial coordinate system defined by an X-axis, a Y-axis, and a Z-axis that are orthogonal to each other. Here, the X-axis may represent the width direction of an electronic device, the Y-axis may represent the length direction of the electronic device, and the Z-axis may represent the height (or thickness) direction of the electronic device. In the following description, a "first direction" may refer to a direction parallel to the Z-axis.

Referring to FIGS. 2A and 2B, in an embodiment, the electronic device 200 may include a foldable housing 201 and a flexible or foldable display 250 (hereinafter, the "display" 250 in short) (e.g., the display module 160 of FIG. 1) disposed in a space formed by the foldable housing 201. A surface on which the display 250 is disposed (or a surface on which the display 250 is viewed from the outside of the electronic device 200) may be defined as the front surface of the electronic device 200. In addition, a surface opposite to the front surface may be defined as the rear surface of the electronic device 200. In addition, a surface surrounding a space between the front surface and the rear surface may be defined as the side surface of the electronic device 200.

According to various embodiments, the foldable housing 201 may include a first housing structure 210, a second housing structure 220 including a sensor area 222, a first rear cover 215, a second rear cover 225, and a hinge structure 230. Here, the hinge structure 230 may include a hinge cover that covers a foldable portion of the foldable housing 201. The foldable housing 201 of the electronic device 200 is not limited to the shape and combination of components shown in FIGS. 2A and 2B and may be implemented in a different shape or a different combination of components. For example, in an embodiment, the first housing structure 210 and the first rear cover 215 may be formed as one and the second housing structure 220 and the second rear cover 225 may be formed as one.

According to various embodiments, the first housing structure 210 may be connected to the hinge structure 230 and may include a first surface facing a first direction and a second surface facing a second direction opposite to the first direction. The second housing structure 220 may be connected to the hinge structure 230 and may include a third surface facing a third direction and a fourth surface facing a fourth direction opposite to the third direction. The second housing structure 220 may rotate with respect to the first housing structure 210 about the hinge structure 230. A state of the electronic device 200 may be changed to a folded state or a flat state.

According to an embodiment, the first surface may face the third surface in a state in which the electronic device 200 is fully folded, and the third direction may be identical to the first direction in a state in which the electronic device 200 is fully flat.

According to various embodiments, the first housing structure 210 and the second housing structure 220 may be disposed on both sides of a folding axis A and may generally be symmetrical with respect to the folding axis A. As described below, an angle or distance between the first housing structure 210 and the second housing structure 220 may vary depending on whether the electronic device 200 is in the flat state, the folded state, or an intermediate state (e.g., a partially folded state or a partially unfolded state). According to an embodiment, unlike the first housing structure 210, the second housing structure 220 may additionally include the sensor area 222 in which various sensors are arranged; however, the first housing structure 210 and the second housing structure 220 may have shapes symmetrical to each other in areas other than the sensor area 222.

According to various embodiments, as shown in FIG. 2A, the first housing structure 210 and the second housing structure 220 may together form a recess for accommodating the display 250. According to an embodiment, due to the sensor area 222, the recess may have at least two different widths in a direction perpendicular to the folding axis A. For example, the recess may have a first width W1 between a first portion 210*a* of the first housing structure 210 parallel to the folding axis A and a first portion 220*a* of the second housing structure 220 formed on the periphery of the sensor area 222, and a second width W2 formed by a second portion 210*b* of the first housing structure 210 and a second portion 220*b* of the second housing structure 220 not corresponding to the sensor area 222 and parallel to the folding axis A. In this case, the second width W2 may be greater than the first width W1. According to embodiment, the first portion 220*a* and the second portion 220*b* of the second housing structure 220 may be at different distances from the folding axis A. The width of the recess is not limited to the shown example. In another embodiment, the recess may have a plurality of widths due to the shape of the sensor area 222 or asymmetrical portions of the first housing structure 210 and the second housing structure 220. According to various embodiments, the sensor area 222 may be formed to have a predetermined area adjacent to one corner of the second housing structure 220. However, the arrangement, shape, and size of the sensor area 222 are not limited to the shown example. For example, in another embodiment, the sensor area 222 may be provided at another corner of the second housing structure 220 or in a predetermined area between an upper corner and a lower corner of the second housing structure 220. In an embodiment, components embedded in the electronic device 200 to perform various functions may be exposed from the front surface of the electronic device 200 through the sensor area 222 or through one or more openings provided in the sensor area 222. In various embodiments, the components may include various types of sensors. The sensors may include, for example, at least one of a front camera, a receiver, or a proximity sensor. According to various embodiments, the sensor area 222 may not be included in the second housing structure 220 or may be at a position different from that shown in the drawings.

According to various embodiments, at least a portion of the first housing structure 210 and the second housing structure 220 may be formed of a metal material or a non-metal material having a selected magnitude of rigidity to support the display 250. At least a portion of the first housing structure 210 and the second housing structure 220 formed of a metal material may provide a ground plane for the electronic device 200 and may be electrically connected to a ground line formed on a PCB disposed in the foldable housing 201.

According to various embodiments, the first rear cover 215 may be disposed on one side of the folding axis A on the rear surface of the electronic device 200 and may have, for example, a substantially rectangular periphery that may be enclosed by the first housing structure 210. Similarly, the second rear cover 225 may be disposed on another side of the folding axis A on the rear surface of the electronic device 200 and may have a periphery that may be enclosed by the second housing structure 220.

According to various embodiments, the first rear cover 215 may be substantially symmetrical to the second rear cover 225 with respect to the folding axis A. However, the first rear cover 215 and the second rear cover 225 are not necessarily mutually symmetrical, and in another embodiment, the electronic device 200 may include a first rear cover 215 and a second rear cover 225 having various shapes. In another embodiment, the first rear cover 215 may be formed integrally with the first housing structure 210 and the second rear cover 225 may be formed integrally with the second housing structure 220.

According to various embodiments, the first rear cover 215, the second rear cover 225, the first housing structure 210, and the second housing structure 220 may form a space in which various components (e.g., a PCB or a battery) of the electronic device 200 are to be arranged. According to an embodiment, one or more components may be disposed or visually exposed on the rear surface of the electronic device 200. For example, at least a portion of a sub-display may be visually exposed through a first rear area 216 of the first rear cover 215. In another embodiment, one or more components or sensors may be visually exposed through a second rear area 226 of the second rear cover 225. In various embodiments, the sensors may include a proximity sensor and/or a rear camera.

According to various embodiments, a front camera exposed from the front surface of the electronic device 200 through one or more openings provided in the sensor area 222, or a rear camera exposed through the second rear area 226 of the second rear cover 225 may include one or more lenses, an image sensor, and/or an ISP. A flash may include, for example, a light-emitting diode (LED) or a Xenon lamp. In some embodiments, two or more lenses (e.g., IR camera, wide-angle, and telephoto lenses) and image sensors may be arranged on one surface of the electronic device 200.

Referring to FIG. 2B, the hinge cover may be disposed between the first housing structure 210 and the second housing structure 220 to cover internal components (e.g., the hinge structure 230). According to an embodiment, the hinge structure 230 may be covered by a portion of the first housing structure 210 and a portion of the second housing structure 220, or may be exposed to the outside, depending on the state (e.g., the flat state, the intermediate state, or the folded state) of the electronic device 200.

According to an embodiment, when the electronic device 200 is in the flat state (e.g., a full-flat state) as illustrated in FIG. 2A, the hinge structure 230 may be covered by the first housing structure 210 and the second housing structure 220 and not be exposed. In another example, when the electronic device 200 is in the folded state (e.g., a fully folded state), as shown in FIG. 2B, the hinge structure 230 may be exposed to the outside between the first housing structure 210 and the second housing structure 220. In yet another example, when the first housing structure 210 and the second housing structure 220 are in an intermediate state of being folded with a predetermined angle, the hinge structure 230 may be exposed to the outside between the first housing structure 210 and the second housing structure 220. In this example, an exposed area may be less than an area exposed in the fully folded state. In an embodiment, the hinge structure 230 may have a curved surface.

According to various embodiments, the display 250 may be disposed in a space formed by the foldable housing 201. For example, the display 250 may be seated on the recess formed by the foldable housing 201 and may be viewed from the outside through the front surface of the electronic device 200. For example, the display 250 may constitute most of the front surface of the electronic device 200. Accordingly, the front surface of the electronic device 200 may include the display 250, and a partial area of the first housing structure 210 and a partial area of the second housing structure 220, which are adjacent to the display 250. In addition, the rear surface of the electronic device 200 may include the first rear cover 215, a partial area of the first housing structure 210 adjacent to the first rear cover 215, the second rear cover 225, and a partial area of the second housing structure 220 adjacent to the second rear cover 225.

According to various embodiments, the display 250 may refer to a display having at least a partial area that is transformable into a flat surface or a curved surface. According to an embodiment, the display 250 may include a folding area 253, a first area 251 disposed on one side of the folding area 253 (e.g., on the left side of the folding area 253 shown in FIG. 2A), and a second area 252 disposed on the other side of the folding area 253 (e.g., on the right side of the folding area 253 shown in FIG. 2A).

However, such an area division of the display 250 shown in FIG. 2A is only an example, and the display 250 may be divided into a plurality of areas (e.g., four or more areas or two areas) depending on the structure or functions thereof. For example, as shown in FIG. 2A, the display 250 may be divided into areas based on the folding area 203 extending in parallel to the folding axis A. In an embodiment, the display 250 may be divided into areas based on another folding axis (e.g., a folding axis parallel to the width direction of an electronic device).

According to various embodiments of the present disclosure, the display 250 may be coupled to or disposed adjacent to a touch panel including a touch sensing circuit and a pressure sensor for measuring the strength (pressure) of a touch. For example, the display 250 may be coupled to or disposed adjacent to a touch panel for detecting a stylus pen of an electromagnetic resonance (EMR) type, as an example of the touch panel.

According to various embodiments, the first area 251 and the second area 252 may have globally symmetrical shapes around the folding area 253. However, unlike the first area 251, the second area 252 may include a notch that is cut depending on the presence of the sensor area 222 but may have a shape symmetrical to the first area 251 in the other areas. For example, the first area 251 and the second area 252 may include portions having mutually symmetrical shapes and portions having mutually asymmetrical shapes.

According to various embodiments, the edge thickness of each of the first area 251 and the second area 252 may be different from the edge thickness of the folding area 253. The edge thickness of the folding area 253 may be less than those of the first area 251 and the second area 252. For example, the first area 251 and the second area 252 may be asymmetrical in terms of thickness when cross-sectionally viewed. For example, an edge of the first area 251 may be formed to have a first radius of curvature, and an edge of the second area 252 may be formed to have a second radius of curvature, wherein the second radius of curvature is different from the first radius of curvature. In another embodiment, the first area 251 and the second area 252 may be symmetrical in terms of thickness when cross-sectionally viewed.

Hereinafter, each area of the display 250 and operations of the first housing structure 210 and the second housing structure 220 depending on the state (e.g., the folded state, the flat state, or the intermediate state) of the electronic device 200 are described.

According to various embodiments, when the electronic device 200 is in the flat state (e.g., FIG. 2A), the first housing structure 210 and the second housing structure 220 may be arranged to face the same direction while forming an angle of 180 degrees. The surface of the first area 251 and the surface of the second area 252 of the display 250 may face the same direction (e.g., the front direction of an electronic device) while forming 180 degrees. The folding area 253 may form the same plane in conjunction with the first area 251 and the second area 252.

According to various embodiments, when the electronic device 200 is in the folded state (e.g., FIG. 2B), the first housing structure 210 and the second housing structure 220 may be arranged to face each other. The surface of the first area 251 and the surface of the second area 252 of the display 250 may face each other, forming a narrow angle (e.g., between 0 degrees to 10 degrees). At least a portion of the folding area 253 may form a curved surface having a predetermined curvature.

According to various embodiments, when the electronic device 200 is in the intermediate state, the first housing structure 210 and the second housing structure 220 may be arranged to form a predetermined angle therebetween. The surface of the first area 251 and the surface of the second area 252 of the display 250 may form an angle greater than that in the folded state and less than that in the flat state. At least a portion of the folding area 253 may include a curved surface having a predetermined curvature, and the curvature may be less than that in the folded state.

The upper part of FIG. 2C illustrates a state in which the electronic device 200 is fully flat, and the lower part of FIG. 2C illustrates an intermediate state in which the electronic device 200 is partially unfolded. As described above, the state of the electronic device 200 may be changed to the folded state or the flat state. According to an embodiment, when viewed in a direction of a folding axis (e.g., the folding axis A of FIG. 2A), the electronic device 200 may be folded in two types, i.e., an "in-folding" type in which the front surface of the electronic device 200 is folded to form an acute angle and an "out-folding" type in which the front surface of the electronic device 200 is folded to form an obtuse angle. In an example, in the state in which the electronic device 200 is folded in the in-folding type, the first surface of the first housing structure 210 may face the third surface of the second housing structure 220. In the full-flat state, the first surface of the first housing structure 210 and the third surface of the second housing structure 220 may face substantially the same direction (e.g., a direction substantially parallel to the z-axis).

In another example, when the electronic device 200 is folded in the out-folding type, the second surface of the first housing structure 210 may face the fourth surface of the second housing structure 220.

In addition, although not shown in the drawings, the electronic device 200 may include a plurality of hinge axes (e.g., two parallel hinge axes including the folding axis A of FIG. 2A and another axis parallel to the folding axis A). In this example, the electronic device 200 may also be folded in a "multi-folding" type in which the in-folding type and the out-folding type are combined.

The in-folding type may refer to a state in which the display 250 is not exposed to the outside in the fully folded state. The out-folding type may refer to a state in which the display 250 is exposed to the outside in the fully folded state. The lower part of FIG. 2C shows the intermediate state in which the electronic device 200 is partially unfolded in an in-folding process.

Figure 3A:
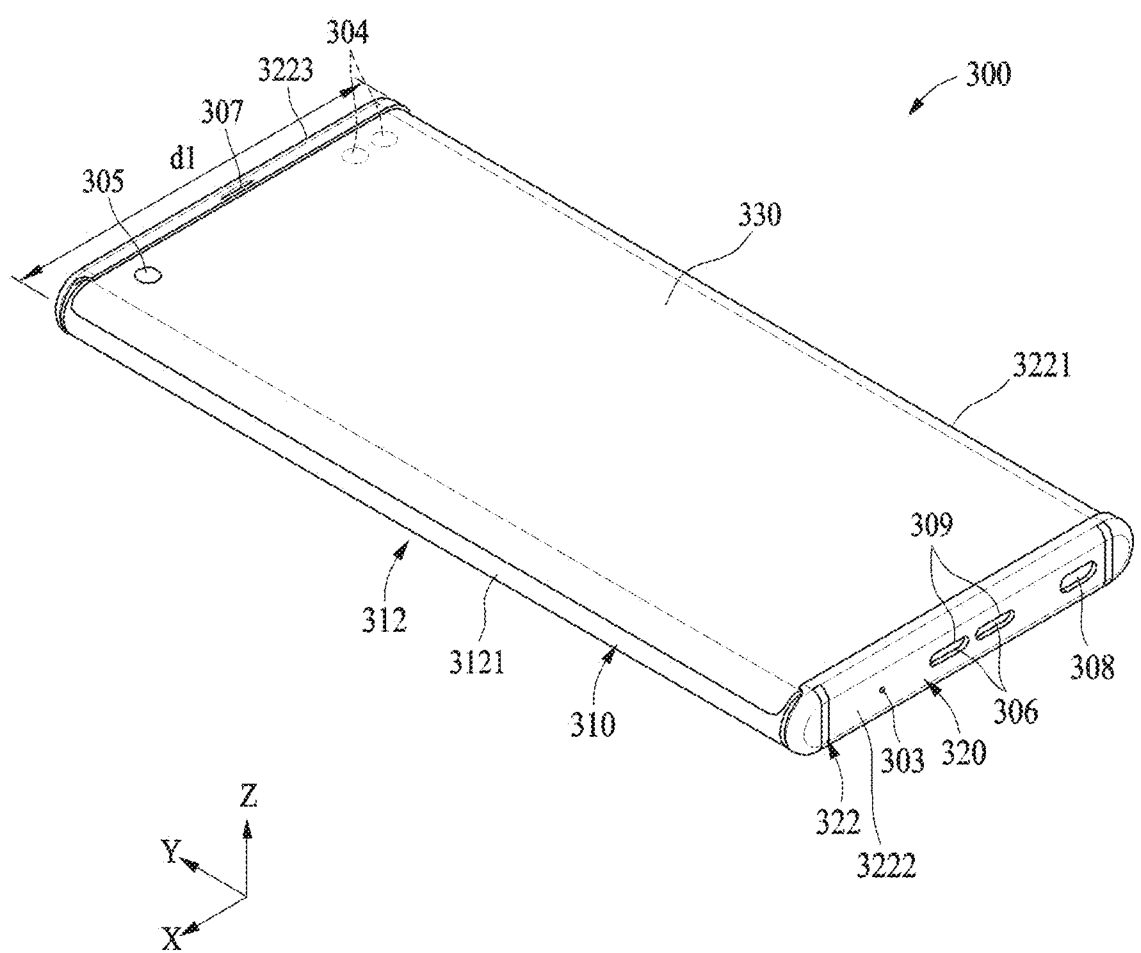
FIGS. 3A and 3B are front perspective views of an electronic device in a closed state and an open state, respectively, according to various embodiments.
Figure 3B:
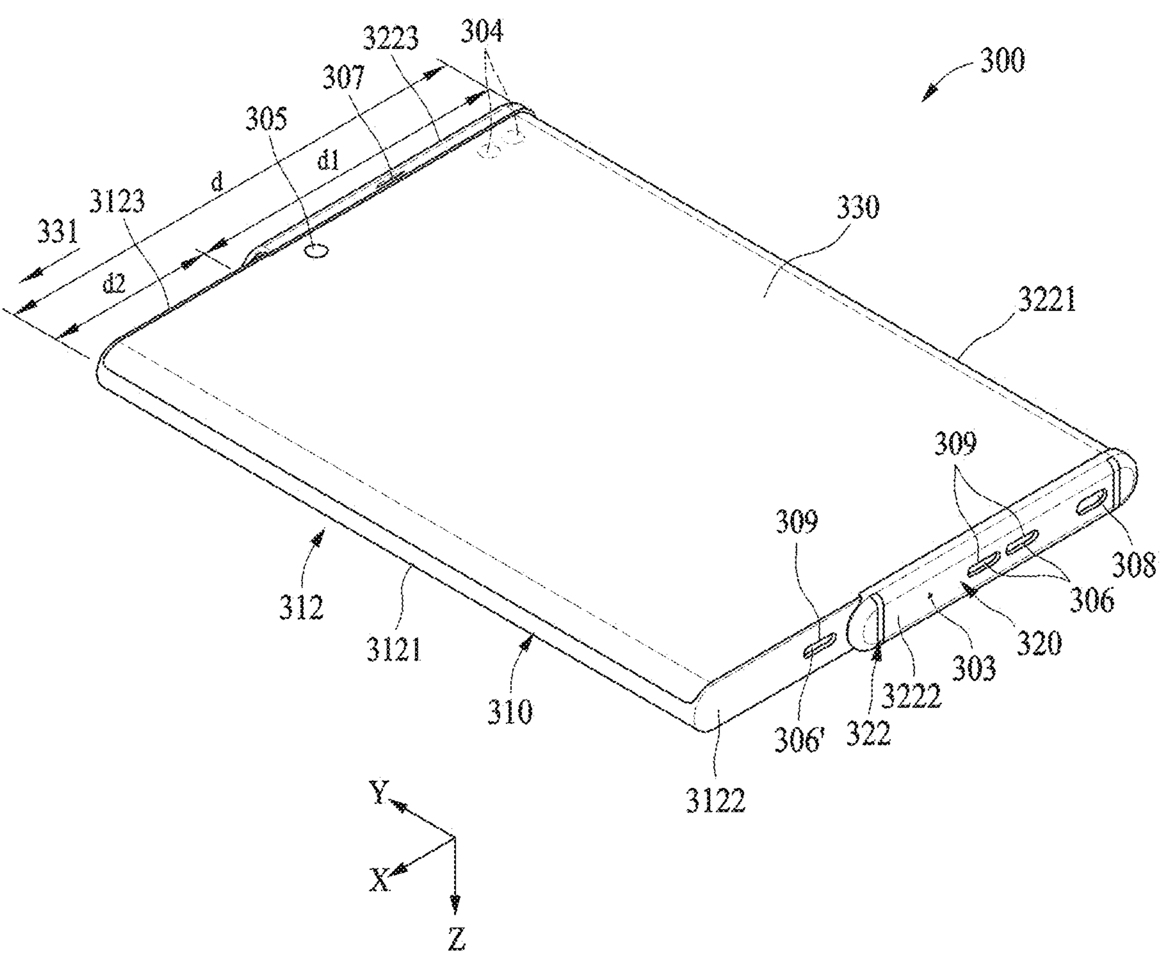
Figure 3C:
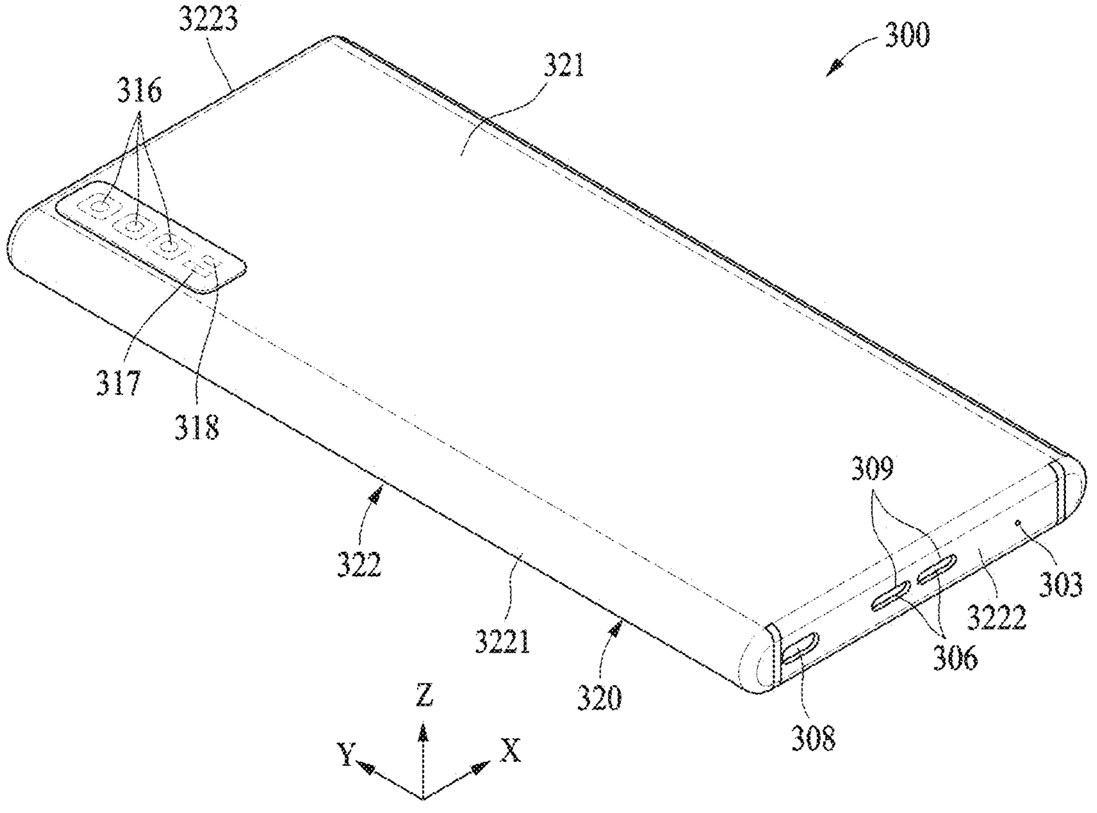
FIGS. 3C and 3D are rear perspective views of the electronic device in a closed state and an open state, respectively, according to various embodiments.
Figure 3D:
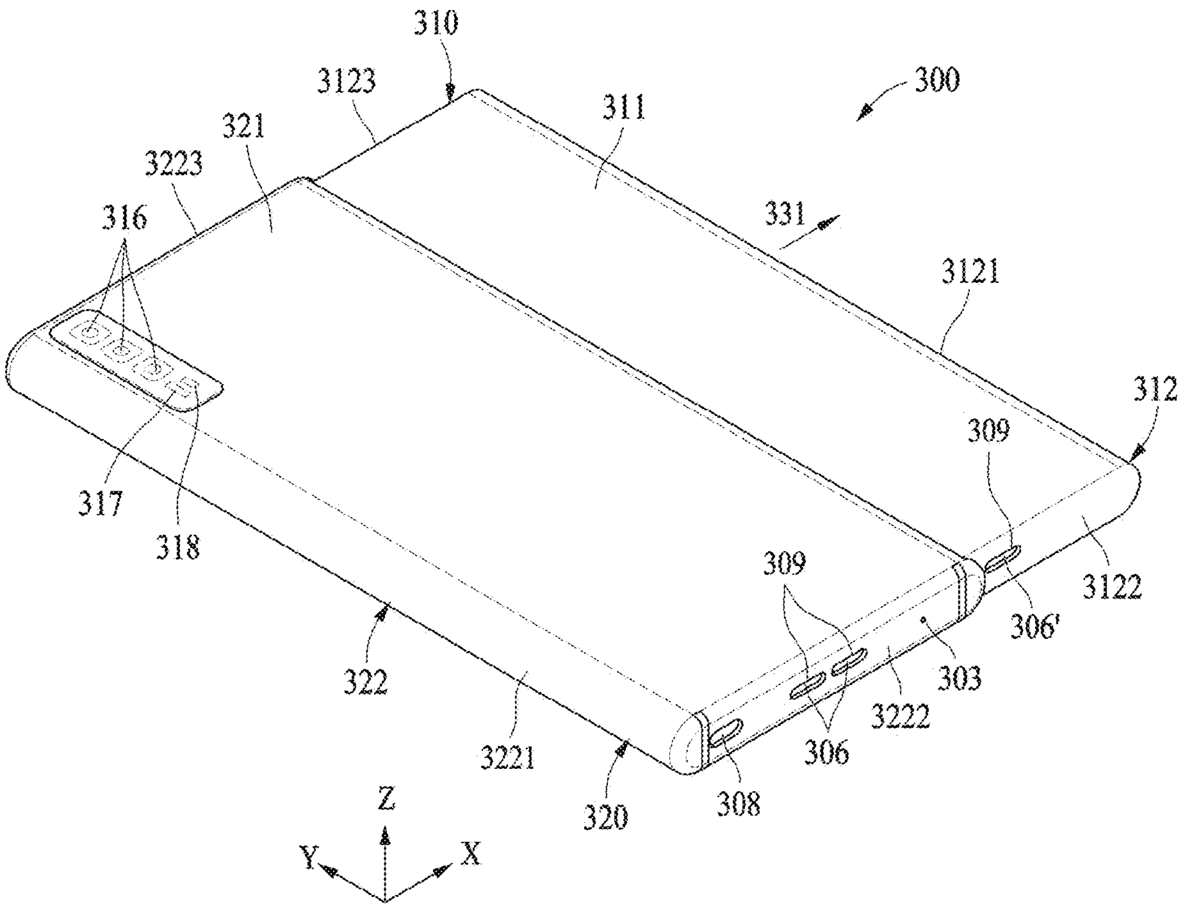

FIGS. 3A and 3B are front perspective views illustrating an electronic device 300 in a closed state and an open state, respectively, according to various embodiments. FIGS. 3C and 3D are rear perspective views illustrating the electronic device 300 in a closed state and an open state, respectively, according to various embodiments. The electronic device 300 of FIGS. 3A to 3D is an example of the electronic device 101 of FIG. 1 and may be a rollable electronic device with an extendable display screen.

The electronic device 300 of FIG. 3A may be at least partially similar to the electronic device 101 of FIG. 1 or may further include other embodiments of an electronic device.

Referring to FIGS. 3A to 3D, the electronic device 300 may include a first housing 310 and a second housing 320 that is at least partially movably coupled to the first housing 310. According to an embodiment, the first housing 310 may include a first plate 311 and a first side frame 312 that extends in a substantially vertical direction (e.g., a z-axis direction) along an edge of the first plate 311. According to an embodiment, the first side frame 312 may include a first side surface 3121, a second side surface 3122 extending from one end of the first side surface 3121, and a third side surface 3123 extending from the other end of the first side surface 3121. According to an embodiment, the first housing 310 may include a first space that is at least partially closed from the outside through the first plate 311 and the first side frame 312.

According to various embodiments, the second housing 320 may include a second plate 321 and a second side frame 322 that extends in a substantially vertical direction (e.g., the z-axis direction) along an edge of the second plate 321. According to an embodiment, the second side frame 322 may include a fourth side surface 3221 facing away from the first side surface 3121, a fifth side surface 3222 extending from one end of the fourth side surface 3221 and at least partially coupled to the second side surface 3122, and a sixth side surface 3223 extending from the other end of the fourth side surface 3221 and at least partially coupled to the third side surface 3123. In another embodiment, the fourth side surface 3221 may extend from a structure other than the second plate 321 and may also be coupled to the second plate 321. According to an embodiment, the second housing 320 may include a second space that is at least partially closed from the outside through the second plate 321 and the second side frame 322. According to an embodiment, the first plate 311 and the second plate 321 may be disposed to at least partially form the rear surface of the electronic device 300. For example, the first plate 311, the second plate 321, the first side frame 312, and the second side frame 322 may be formed of, for example, polymer, coated or colored glass, ceramic, metal (e.g., aluminum, stainless steel (STS), or magnesium), or a combination of two or more of the above materials.

According to various embodiments, the electronic device 300 may include a flexible display 330 disposed to be supported by the first housing 310 and the second housing 320. According to an embodiment, the flexible display 330 may include a flat portion supported by the second housing 320, and a bendable portion extending from the flat portion and supported by the first housing 310. According to an embodiment, the bendable portion of the flexible display 330 may be arranged in the first space of the first housing 310 not to be exposed to the outside when the electronic device 300 is closed and may be exposed to the outside to extend from the flat portion while being supported by the first housing 310 when the electronic device 300 is open. Accordingly, the electronic device 300 may be a rollable electronic device in which a display screen of the flexible display 330 expands in response to an open operation according to movement of the first housing 310 from the second housing 320.

According to various embodiments, in the electronic device 300, the first housing 310 may be at least partially inserted into the second space of the second housing 320, and may be coupled to be movable in direction 331. For example, in the closed state, the electronic device 300 may be maintained in a state in which the first housing 310 and the second housing 320 are coupled such that a distance between the first side surface 3121 and the fourth side surface 3221 is a first distance d1. According to an embodiment, in the open state, the electronic device 300 may be maintained in a state in which the first housing 310 protrudes from the second housing 320 to have a second interval distance d in which the first side surface 3121 protrudes from the fourth side surface 3221 by a predetermined distance d2. According to an embodiment, the flexible display 330 may be supported by the first housing 310 and/or the second housing 320 such that both ends thereof have curved edges, in the open state.

According to various embodiments, the electronic device 300 may automatically transition between the open state and the closed state by a driving unit disposed in the first space and/or the second space. For example, a processor (e.g., the processor 120 of FIG. 1) of the electronic device 300 may be configured to control an operation of the first housing 310 using the driving unit when an event for a transition between the open state and the closed state of the electronic device 300 is detected. In another embodiment, the first housing 310 may manually protrude from the second housing 320 through a user's manipulation. In this case, the first housing 310 may protrude by a protrusion amount desired by the user, and thus, a screen of the flexible display 330 may vary to have various display areas. Accordingly, the processor (e.g., the processor 120 of FIG. 1) of the electronic device 300 may display an object in various ways corresponding to a display area corresponding to a predetermined protrusion amount of the first housing 310 and may control execution of an application program.

According to various embodiments, the electronic device 300 may include at least one of an input device 303, sound output devices 306 and 307, sensor modules 304 and 317, camera modules 305 and 316, a connector port 308, a key input device (not shown), or an indicator (not shown). In another embodiment, at least one of the above-described components of the electronic device 300 may be omitted, or the electronic device 300 may further include other components.

According to various embodiments, the input device 303 may include a microphone 303. In some embodiments, the input device 303 may include a plurality of microphones 303 arranged to sense a direction of sound. The sound output devices 306 and 307 may include speakers 306 and 307. The speakers 306 and 307 may include an external speaker 306' and a phone call receiver 307. In another embodiment, when an external speaker 306' is arranged in the first housing 310, sound may be output through a speaker hole 309 formed in the second housing 320 in the closed state. According to an embodiment, the microphone 303 and the connector port 308 may also be formed to have substantially the same configuration. In another embodiment, the sound output devices 306 and 307 may include a speaker (e.g., a piezo speaker) that operates without a separate speaker hole 309.

According to various embodiments, the sensor modules 304 and 317 may generate an electrical signal or a data value corresponding to an internal operational state of the electronic device 300 or an external environmental state. The sensor modules 304 and 317 may include, for example, a first sensor module 304 (e.g., a proximity sensor or an illuminance sensor) disposed on a front surface of the second housing 320, and/or a second sensor module 317 (e.g., a heart rate monitoring (HRM) sensor) disposed on a rear surface of the second housing 320. According to an embodiment, the first sensor module 304 may be disposed below the flexible display 330 in the second housing 320. According to an embodiment, the first sensor module 304 may further include at least one of a proximity sensor, an illuminance sensor 304, a time of flight (ToF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an IR sensor, a biometric sensor, a temperature sensor, or a humidity sensor.

According to various embodiments, the camera modules 305 and 316 may include a first camera module 305 disposed on the front surface of the second housing 320 of the electronic device 300, and a second camera module 316 disposed on the rear surface of the second housing 320. According to an embodiment, the electronic device 300 may include a flash 318 located near the second camera module 316. According to an embodiment, the camera modules 305 and 316 may include one or more lenses, an image sensor, and/or an ISP. According to an embodiment, the first camera module 305 may be disposed under the flexible display 330 and may be configured to capture an object through a portion of an active area of the flexible display 330. According to an embodiment, the flash 318 may include, for example, an LED or a Xenon lamp. In some embodiments, two or more lenses (e.g., a wide-angle lens and a telephoto lens) and image sensors may be disposed on one surface of the electronic device 300.

According to various embodiments, the electronic device 300 may include at least one antenna (not shown). According to an embodiment, the at least one antenna may wirelessly communicate with an external electronic device (e.g., the electronic device 104 of FIG. 1), or may wirelessly transmit and receive power required for charging. According to an embodiment, the antenna may include a legacy antenna, a mmWave antenna, a near field communication (NFC) antenna, a wireless charging antenna, and/or a magnetic secure transmission (MST) antenna. As another embodiment, an antenna structure may be formed through at least a portion of the first side frame 312 and/or the second side frame 322, which are formed of metal.

The electronic device according to various embodiments disclosed herein may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," may include any one of the items listed together in the corresponding one of the phrases, or all possible combinations thereof. Terms such as "1st" and "2nd," or "first" and "second" may be used to simply distinguish a corresponding component from other components, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 4:
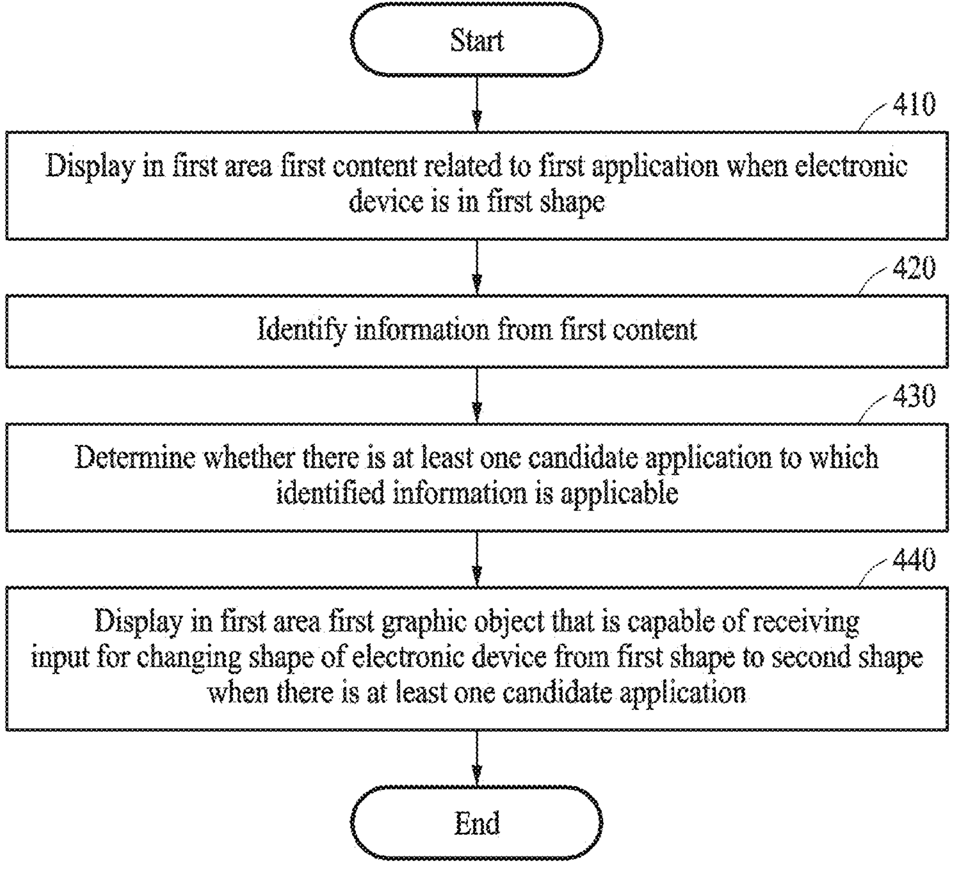
FIG. 4 is a flowchart illustrating an operation of displaying a first graphic object, according to an embodiment.

FIG. 4 is a flowchart illustrating an operation of displaying a first graphic object, according to an embodiment.

In operation 410, when an electronic device (e.g., the electronic device 101 of FIG. 1, the electronic device 200 of FIG. 2, or the electronic device 300 of FIG. 3) is in a first shape (see, e.g., FIG. 2B or FIG. 3A), the electronic device may display first content related to a first application in a first area. A display module (e.g., the display module 160 of FIG. 1) of the electronic device may have a screen area including the first area and a second area. When the shape of the electronic device is the first shape, the electronic device may activate the first area. When the shape of the electronic device is a second shape (see, e.g., FIG. 2A or FIG. 3B), the electronic device may activate the second area.

The electronic device according to an embodiment may be a transformable electronic device. The transformable electronic device may include a foldable type electronic device and a rollable type electronic device.

For example, the electronic device may be a foldable type electronic device including a foldable display disposed in a space formed by a foldable housing. In this example, the first shape may be the shape of the electronic device in a folded state (see, e.g., FIG. 2B) and the second shape may be the shape of the electronic device in a flat state (see, e.g., FIG. 2A). When the electronic device is an in-folding foldable type, the first area may be a screen area (e.g., a screen area of a sub-display) shown when the electronic device is in the folded state and the second area may be a screen area (e.g., a screen area of a main display) shown when the electronic device is in the flat state. When the electronic device is an out-folding foldable type, the first area may be a screen area shown when the electronic device is in the folded state and the second area may be an extended screen area, which is the part of a whole screen area shown when the electronic device is in the flat state and does not include a screen area (e.g., the first area) shown when the electronic device is in the folded state.

In another example, the electronic device may be a rollable type electronic device having a display with an extendable display screen. In this example, the first shape may be the shape of the electronic device before the display screen is extended (see, e.g., FIG. 3A) and the second shape may be the shape of the electronic device after the display screen of the electronic device is extended (see, e.g., FIG. 3B). The first area may be the screen area shown before the display screen is extended. The second area may be an extended screen area, which is the part of a whole screen area shown when the display screen is extended and does not include the screen area (e.g., the first area) shown before the display screen is extended.

In yet another example, when the electronic device is in the first shape, the first area may be defined as an area where first content is output. When the electronic device is in the first shape, the first area may be defined as an area that may receive a user input.

In operation 420, the electronic device may identify information from the first content. Here, the information may include text recognized in content and information related to a schedule (e.g., date or time), a location, a bank account, or a phone number identified from the text. Furthermore, the information may include an image extracted from content (e.g., a video), an application corresponding to the content, and attributes of the application corresponding to the content.

In operation 430, the electronic device may determine whether there is at least one candidate application to which the identified information may be applied. Here, a candidate application may be the same as or different from the first application. Here, a candidate application to which the identified information may be applied may be a third-party application and, furthermore, a program (e.g., a native application) of the electronic device itself. For example, when the information identified in the first content is an image captured through a screen capture function, the electronic device may determine that there is the candidate application to which the identified information may be applied not only when the captured image is applied to the candidate application through a third-party application but also when the captured image is stored through a screen capture storage function of the electronic device. Depending on the type of information (e.g., schedule-related information, location-related information, bank account-related information, etc.) identified in the first content, an application to which the identified information may be applied may vary.

In operation 440, when there is at least one candidate application to which the identified information may be applied, the electronic device may display, in the first area, a first graphic object that is capable of receiving input for changing the shape of the electronic device from the first shape to the second shape. As described below, the electronic device may display a second graphic object or a third graphic object in addition to the first graphic object. Hereinafter, the term "graphic object" may refer to one of the first graphic object, the second graphic object, and the third graphic object.

Figure 5:
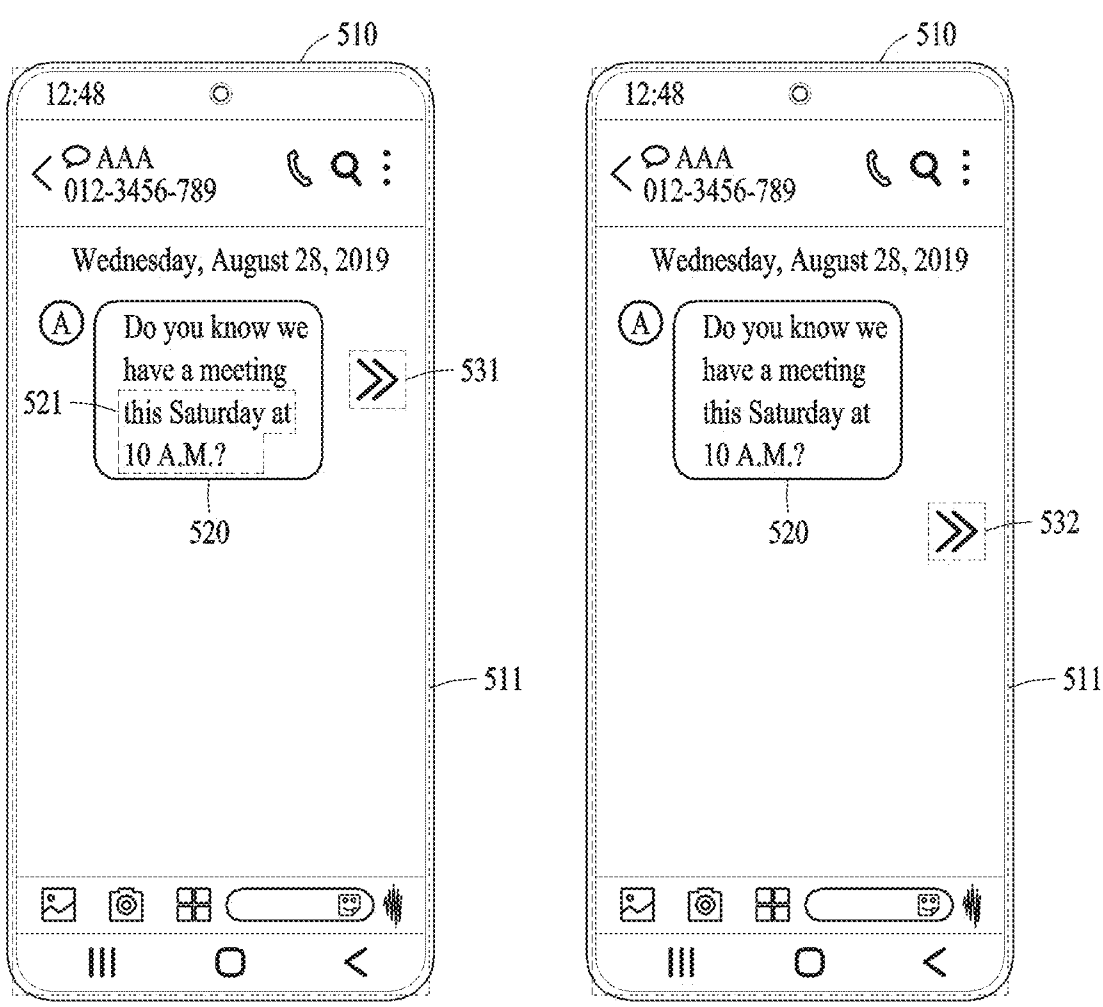
FIG. 5 is a diagram illustrating a display of a first graphic object in a first area, according to an embodiment.

FIG. 5 is a diagram illustrating a display of a first graphic object in a first area, according to an embodiment.

An electronic device 510 (e.g., the electronic device 101 of FIG. 1) according to an embodiment may identify information from first content. According to an embodiment, in response to the occurrence of an event, an electronic device may identify the information from the first content that is identified corresponding to the occurring event. The event may be an event that is generated by a user's manipulation, such as capturing a screen, capturing an image using a camera, and the like and an event of receiving content through a communication module without the user's manipulation, such as receiving a message. For example, when an event of capturing a screen occurs, the electronic device may identify an image captured through screen capture as the first content corresponding to the event. When an event of capturing an image using a camera occurs, the electronic device may identify an image captured by the camera as the first content corresponding to the event. In another example, when an event of receiving a message occurs, the electronic device may identify a received message as the first content.

As illustrated in FIG. 5, when an event of receiving a message occurs, the electronic device 510 may identify a received message as the first content. The electronic device 510 may identify information from the received message. The electronic device 510 may identify schedule-related information 521 (hereinafter, referred to as schedule information) from text 520 recognized in the received message. Here, schedule-related information may include at least one of date-related information and time-related information. The electronic device 510 may determine whether there is at least one candidate application to which the schedule information 521 may be applied. For example, when there is a calendar application to which the schedule information 521 may be applied in the electronic device 510, the electronic device 510 may display, in a first area 511, first graphic objects 531 and 532 that may receive input for changing the shape of the electronic device 510 from a first shape to a second shape. For example, the electronic device 510 may display the first graphic object 531 near the text 520 recognized in the first content or display the first graphic object 532 at the edge of the first area 511. By displaying the first graphic objects 531 and 532 in the first area 511, the electronic device 510 may provide a user with a notification indicating that there is a candidate application to which information identified by the text 520 recognized in the first content may be applied.

Figure 6:
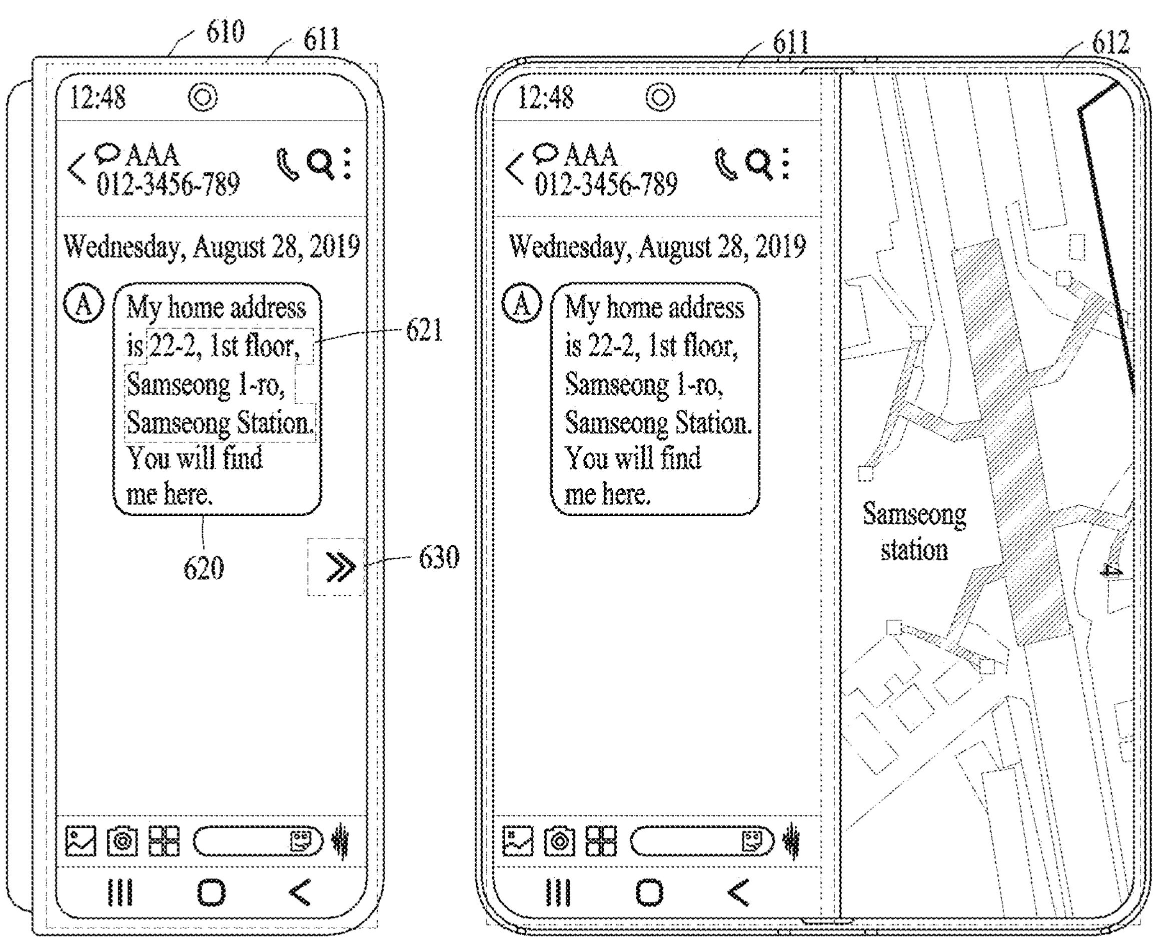
FIG. 6 is a diagram illustrating a display of second content related to a second application, according to an embodiment.

FIG. 6 is a diagram illustrating a display of second content related to a second application, according to an embodiment.

When there is at least one candidate application to which information identified in first content may be applied, an electronic device 610 (e.g., the electronic device 101 of FIG. 1) according to an embodiment may select the second application to which the identified information is applied from among the at least one candidate application. The electronic device 610 may receive a user input selecting a first graphic object that may receive input for changing the shape of the electronic device from a first shape to a second shape and may display, in a second area, at least a portion of the second content related to the second application corresponding to identified information when the shape of the electronic device is changed to the second shape. Here, the second content may, for example, represent content displaying the identified information applied to the second application when the second application is executed. The second content may be, for example, content displaying an event, which corresponds to schedule information, added to a calendar application, content displaying an address search result corresponding to location-related information in a map application, and content displaying a financial institution and a bank account number, which correspond to account number-related information, recorded in a financial application.

For example, as illustrated in FIG. 6, when an event of receiving a message occurs, the electronic device 610 may identify a received message as the first content. The electronic device 610 may identify location-related information 621 (hereinafter, referred to as location information) from text 620 recognized in the first content. The electronic device 610 may determine whether there is at least one candidate application to which the location information 621 may be applied. When there is at least one candidate application (e.g., a map application) to which the location information 621 may be applied, the electronic device 610 may display, in a first area 611, a first graphic object 630 that is capable of receiving input for changing the shape of the electronic device to a second shape. When the electronic device includes at least one candidate application, the electronic device 610 may select, from among the at least one candidate application, the second application to which the location information 621 is applied. In addition, the electronic device 610 may receive a user input selecting the first graphic object 630. When the shape of the electronic device 610 is changed from the first shape to the second shape, the electronic device 610 may display, in a second area 612, at least a portion of the second content related to the second application.

For example, the shape of the electronic device 610 may change automatically. In response to receiving the user input selecting the first graphic object 630, the electronic device 610 may change the shape of the electronic device 610 from the first shape to the second shape by driving a motor. In another example, the shape of the electronic device 610 may be changed manually. As a driving body of the electronic device 610 is manually moved by an external force by a user, the shape of the electronic device 610 may be changed from the first shape to the second shape. In yet another example, the shape of the electronic device 610 may be changed semi-automatically. In response to receiving the user input selecting the first graphic object 630, the electronic device 610 may partially change the shape of the electronic device 610 by moving the driving body through motor operation at a predetermined angle or distance. The electronic device 610 may induce the user to finally change the shape of the electronic device 610. As the user manually moves the driving body of the electronic device 610 using external force, the shape of the electronic device 610 may be finally changed from the first shape to the second shape.

For example, as illustrated in FIG. 6, when the electronic device 610 is an out-folding foldable type, the second shape may be the shape of the electronic device in a flat state. As described above, the second area 612 may be a screen area, which is the part of a whole screen area shown when the electronic device is in the flat state and does not include the first area 611 shown when the electronic device is in a folded state. The electronic device 610 may display, in the second area 612, at least a portion of the second content related to the second application. For example, the electronic device 610 may display the second content only in the second area 612, display the second content only in a partial area of the second area 612, and display the second content in an area including the second area 612.

Figure 7:
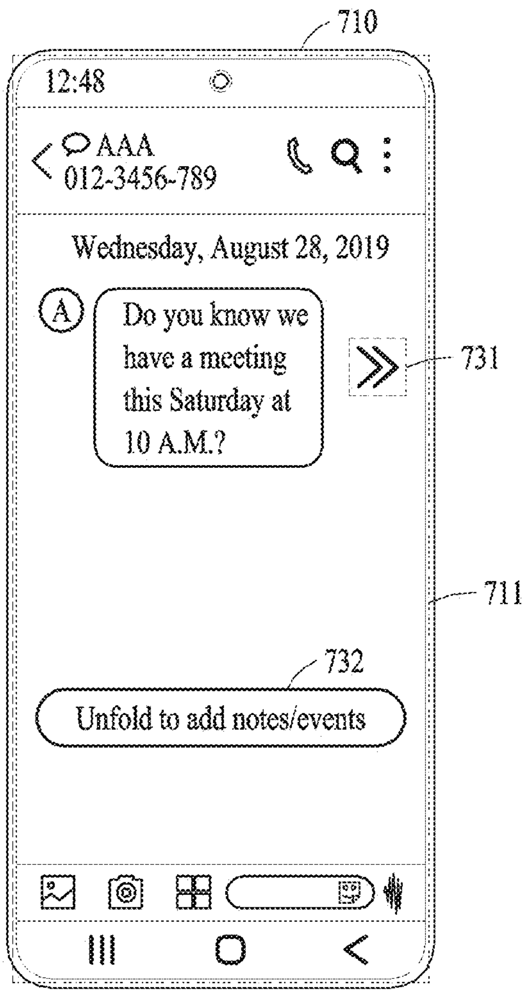
FIG. 7 is a diagram illustrating a display of various types of a first graphic object, according to an embodiment.

FIG. 7 is a diagram illustrating a display of various types of a first graphic object, according to an embodiment.

An electronic device 710 (e.g., the electronic device 101 of FIG. 1) according to an embodiment may display a first graphic object in a first area for a preset time and remove the display of the first graphic object when the preset time elapses. For example, as illustrated in FIG. 7, the electronic device 710 may also display, in a first area 711, a plurality of first graphic objects 731 and 732 that may receive input for changing the shape of the electronic device 710 from a first shape to a second shape. For example, the electronic device 710 may display the first graphic objects 731 and 732 together in the first area 711, wherein the first graphic object 731 is an icon with an arrow shape and the first graphic object 732 is a pop-up message. For example, the electronic device 710 may display, in the first area 711, the first graphic object 732, which is a pop-up message, for a preset time (e.g., two seconds) and remove the display of the first graphic object 732 when the preset time elapses.

Figure 8:
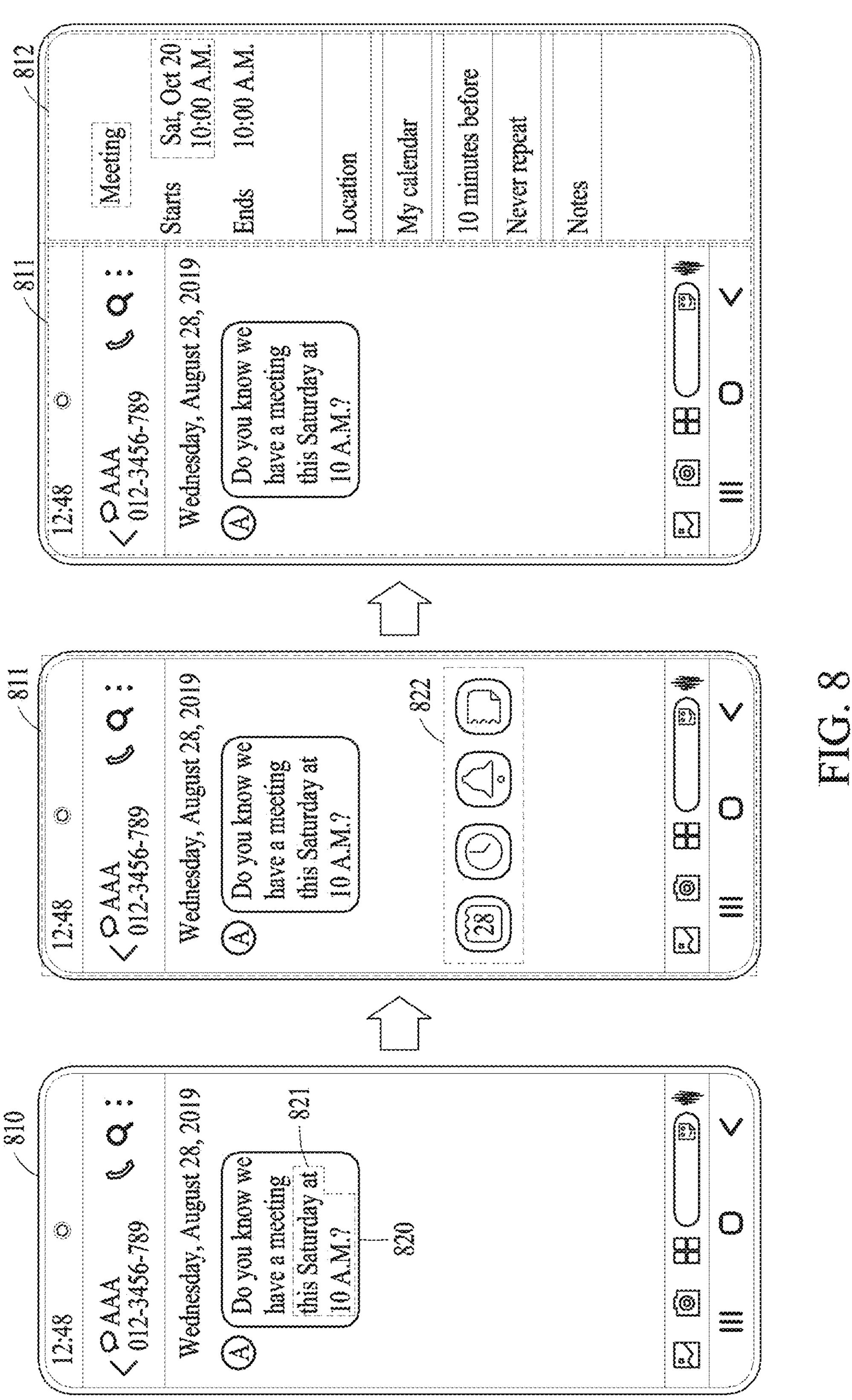
FIG. 8 is a diagram illustrating selection of a second application to which identified information is applied, according to an embodiment.

FIG. 8 is a diagram illustrating selection of a second application to which identified information is applied, according to an embodiment.

An electronic device 810 (e.g., the electronic device 101 of FIG. 1) according to an embodiment may select, from among at least one candidate application, the second application to which information identified in first content is applied. The electronic device 810 may preset a candidate application to which the identified information is applied. In this case, the electronic device 810 may select the preset candidate application as the second application. On the other hand, when the candidate application to which the identified information is applied is not preset, the electronic device 810 may display, in a first area, at least one icon indicating at least one candidate application. Based on a user input selecting one icon of the at least one icon, the electronic device 810 may select a candidate application indicated by the icon as the second application.

For example, as illustrated in FIG. 8, the electronic device 810 may identify a received message as first content and identify schedule information 821 from text 820 recognized from the identified first content. When a candidate application to which the schedule information 821 is applied is preset, the electronic device 810 may select the preset candidate application as the second application. The electronic device 810 may display, in a second area 812, second content related to the preset candidate application. On the other hand, when the candidate application to which the schedule information 821 is applied is not preset, the electronic device 810 may display, in the first area 811, a graphic object 822 including icons respectively indicating candidate applications that may execute the schedule information 821. In response to receiving a user input selecting one icon of a plurality of icons included in the graphic object 822, the electronic device 810 may select a candidate application indicated by the icon selected by the user as the second application to which the schedule information 821 is applied. Thereafter, when the shape of the electronic device is changed to a second shape, the electronic device 810 may display, in the second area 812, at least a portion of the second content related to the second application to which the schedule information 821 is applied. Furthermore, when selecting the candidate application to which the schedule information 821 is applied as the second application, even when different schedule information is identified from the first content that is different from the second content, the electronic device 810 may automatically set an application to which the different schedule information is applied as the second application.

Figure 9:
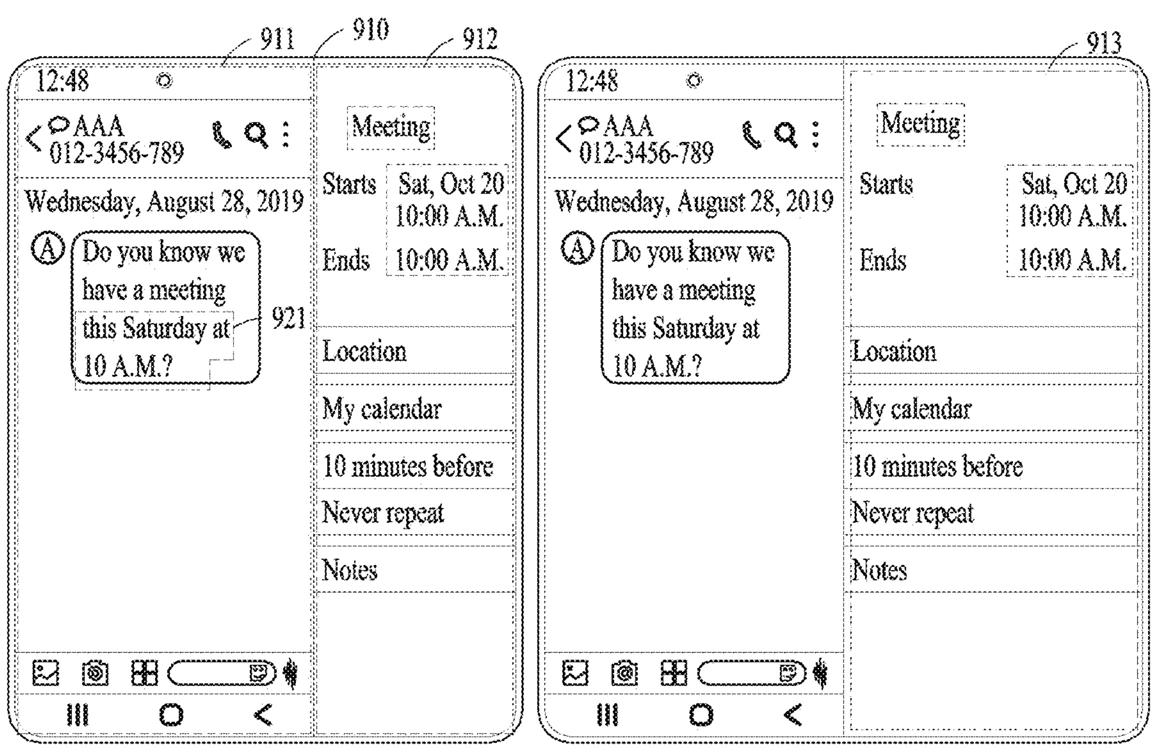
FIGS. 9 and 10 are diagrams illustrating a display of second content, according to an embodiment.
Figure 10:
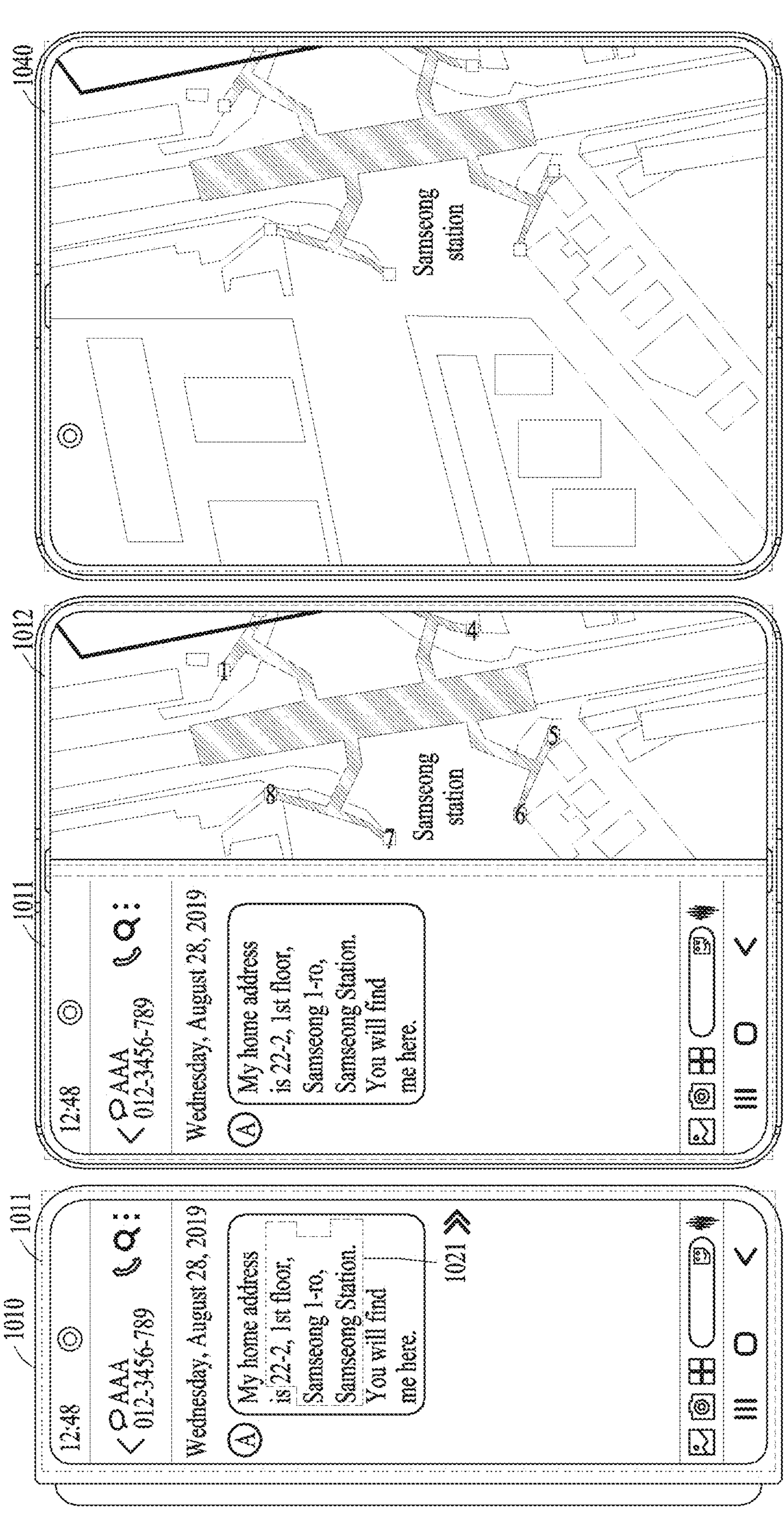

FIGS. 9 and 10 are diagrams illustrating a display of second content, according to an embodiment.

When the shape of an electronic device (e.g., the electronic device 101 of FIG. 1) according to an embodiment is changed to a second shape, the electronic device may display the second content related to a second application in a whole screen area shown when the shape of the electronic device is the second shape. For example, the electronic device may display the second content in a partial area of the whole screen area or may also display the second content across the whole screen area.

According to an embodiment, the electronic device may determine an area in which the second content related to the second application is displayed in the whole screen area shown when the shape of the electronic device is the second shape, based on a user input, and may display the second content in the area determined based on the user input.

According to an embodiment, the electronic device may display a plurality of first graphic objects in a first area. The types of the first graphic objects displayed in the first area may vary based on the area in which the second content related to the second application is displayed. For example, the electronic device may receive a user input selecting an "A type" first graphic object. For example, when the shape of the electronic device is changed to the second shape, the electronic device may display the second content only in a second area, which is an extended screen area. The electronic device may receive a user input selecting a "B type" first graphic object. When the shape of the electronic device is changed to the second shape, the electronic device may display the second content across the whole screen area that is shown when the shape of the electronic device is the second shape.

For example, as illustrated in FIG. 9, an electronic device 910 may be a rollable type electronic device. In this example, a first area 911 may be a screen area before a display screen is extended. A second area 912 may be an extended screen area, which is the part of the whole screen area shown when the display screen is extended, and does not include the first area 911 shown before the display screen is extended. A whole screen area 940 may be a screen area including both the first area 911 and the second area 912. When the shape of the electronic device is changed from the first shape to the second shape, the electronic device 910 may display the second content related to the second application in the whole screen area 940. The electronic device 910 may identify schedule information 921 from first content and select the second application to which the identified schedule information 921 is applied. For example, the electronic device 910 may display the second content only in the second area 912, which is the extended screen area, may divide the whole screen area 940 into two areas of the same size to display the second content in one area 913 of the divided two areas, and may display the second content across the whole screen area 940.

As illustrated in FIG. 10, an electronic device 1010 may be an out-folding foldable type. A first area 1011 may be a screen area shown when the electronic device is in a folded state. A second area 1012 may be an extended screen area, which is the part of a whole screen area 1040 shown when the electronic device is in a flat state and does not include the first area 1011 shown when the electronic device is in the folded state. The electronic device 1010 may identify location information 1021 from first content and select a second application to which the identified location information 1021 is applied. For example, the electronic device 1010 may display the second content only in the second area 1012 or may also display the second content across the whole screen area 1040.

Figure 11:
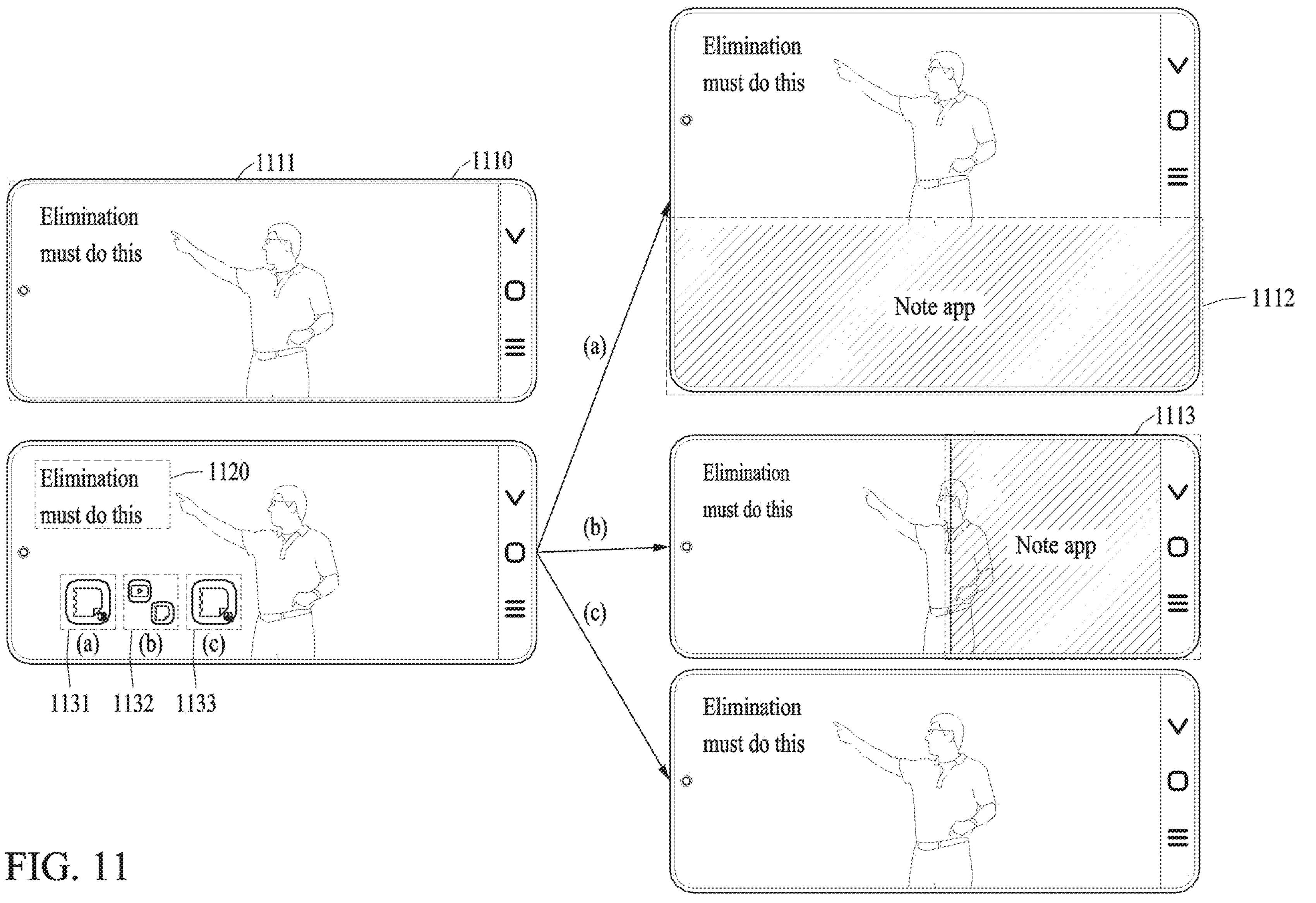
FIG. 11 is a diagram illustrating a display of a second graphic object and a third graphic object in an electronic device according to an embodiment.

FIG. 11 is a diagram illustrating a display of a second graphic object and a third graphic object in an electronic device according to an embodiment.

When there is at least one candidate application to which information identified in first content may be applied, an electronic device 1110 according to an embodiment may display, in a first area 1111, a first graphic object 1131 that may receive input for changing the shape of the electronic device from a first shape to a second shape. The electronic device 1110 may also display, in the first area 1111, a second graphic object 1132 or a third graphic object 1133, in addition to the first graphic object 1131, each capable of receiving input for executing a second application while the electronic device is maintained in the first shape. More particularly, while the electronic device is maintained in the first shape, the electronic device 1110 may display the second graphic object 1132 or the third graphic object 1133 in the first area, wherein the second graphic object is capable of receiving input displaying second content related to the second application in one area divided from the first area and the third graphic object is capable of receiving an input for executing the second application only in the background, for example. However, when the second application is not able to be executed only in the background, the third graphic object 1133 may not be displayed on a screen area. When receiving a user input selecting the second graphic object 1132, the electronic device may display at least a portion of the second content in the first area. When receiving a user input selecting the third graphic object 1133, the electronic device may execute the second application in the background to apply identified information to the executed second application. The appearance of the first graphic object 1131, the second graphic object 1132, and the third graphic object 1133 may vary from one another. This is because, depending on selection of a graphic object, different types of graphic objects (e.g., the first graphic object 1131, the second graphic object 1132, or the third graphic object 1133) have different ways of executing the second application or displaying the second content related to the second application.

For example, as illustrated in FIG. 11, the electronic device 1110 may identify an image captured through screen capture as the first content. The electronic device 1110 may identify, as information, text 1120 itself, which is recognized in the captured image. For example, when the ratio of the area of an area occupied by the text 1120 recognized in the first content to the area of the first area 1111 is greater than or equal to a threshold ratio, the electronic device 1110 may identify the text 1120 itself as information. The electronic device 1110 may select a note application as a second application to which the text 1120 is applied. The electronic device 1110 may receive a user input selecting the first graphic object 1131. When the shape of the electronic device is changed from the first shape to the second shape, the electronic device may display in a second area 1112 that is activated, second content related to the note application. For example, the electronic device 1110 may display, in the second area 1112, content displaying the text 1120 written in the note application as the second content. In another example, in response to receiving a user input selecting the second graphic object 1132, the electronic device 1110 may divide the first area into two areas and display the second content in one area 1113 of the two areas while staying in the first shape. The electronic device 1110 may display at least a portion of the second content in the first area 1111. In another example, in response to receiving input selecting the third graphic object 1133 from a user, the electronic device 1110 may execute the note application only in the background while staying in the first shape. The electronic device 1110 may automatically apply text 1120 to the note application by executing the note application in the background. In other words, the electronic device 1110 may execute the note application in the background and record and store the text 1120 through the note application, without displaying the second content in a screen area.

Figure 12:
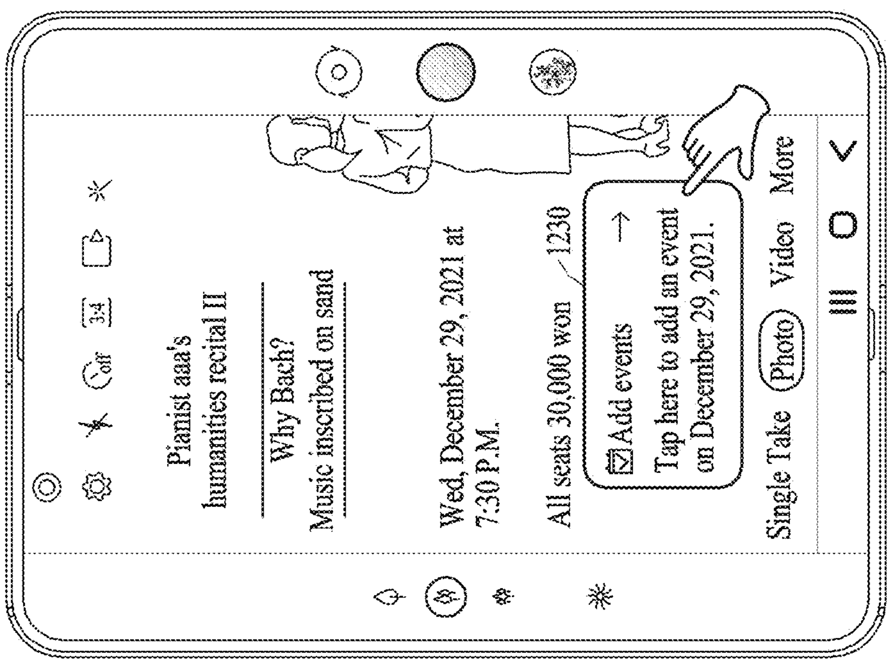
FIG. 12 is a diagram illustrating an example of a display of a graphic object, according to an embodiment.
Figure 12:
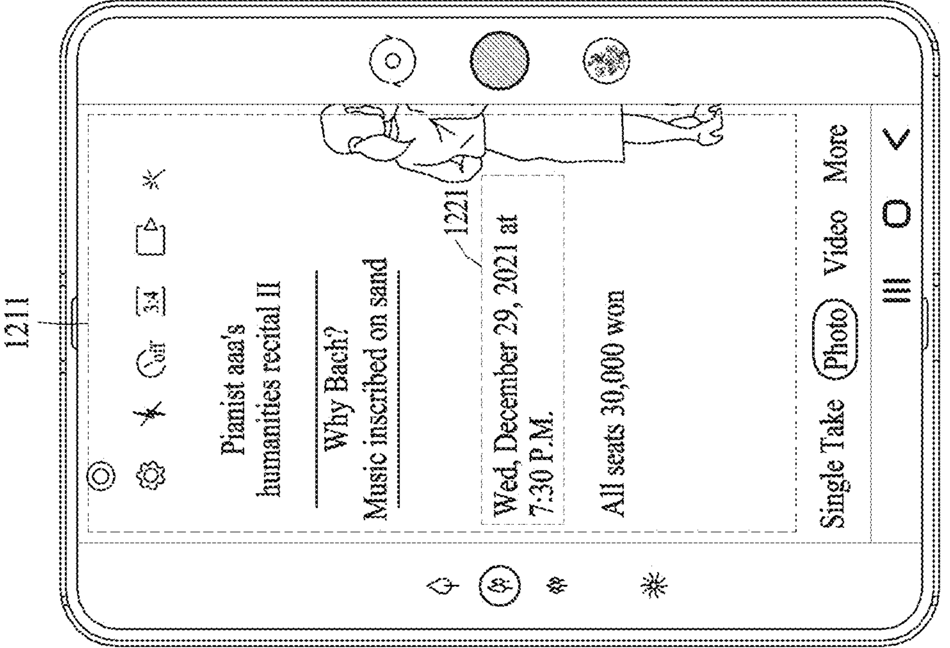

FIG. 12 is a diagram illustrating an example of a display of a graphic object, according to an embodiment.

An electronic device (e.g., the electronic device 101 of FIG. 1) according to an embodiment may identify information from text recognized in first content. According to an embodiment, when there is at least one candidate application to which identified information may be applied and the identified information satisfies a preset condition, the electronic device may display a graphic object (e.g., a first graphic object, a second graphic object, or a third graphic object) that may receive input for executing a second application. For example, the graphic object may include the content of the identified information. When receiving a user input selecting the graphic object, the electronic device may execute the second application to apply the identified information to the second application. In other words, by displaying the graphic object in a first area, the electronic device may provide a user with an option of performing an operation of executing the second application.

For example, as illustrated in FIG. 12, the electronic device may identify an image as first content, wherein the image is captured corresponding to an event of capturing an image using a camera. The electronic device may identify schedule information 1221 from text recognized from the first content. A preset condition may be a condition that the ratio of the area of a screen area occupied by the schedule information 1221, which is identified information, to the area of a screen area (e.g., a first area 1211) shown when the electronic device is in a first shape is greater than or equal to a threshold ratio. When the ratio of the screen area occupied by the schedule information 1221 to the area of the first area 1211 is greater than or equal to the threshold ratio, the electronic device may display, in the first area 1211, a graphic object 1230 that is capable of receiving input for executing a second application. On the other hand, when the ratio of the area of the screen area occupied by the schedule information 1221 to the area of the first area 1211 is less than the threshold ratio, the electronic device may display no graphic object. For example, the threshold ratio may be 10%. However, embodiments are not limited thereto. The electronic device may display the graphic object 1230 as a pop-up message in the first area 1211. The graphic object 1230 may include the content (e.g., "Dec. 29, 2021 at 7:30 P.M.") of the identified schedule information 1221. In response to a user input selecting the graphic object 1230, the electronic device may execute the second application to apply the schedule information 1221 to the second application.

Figure 13:
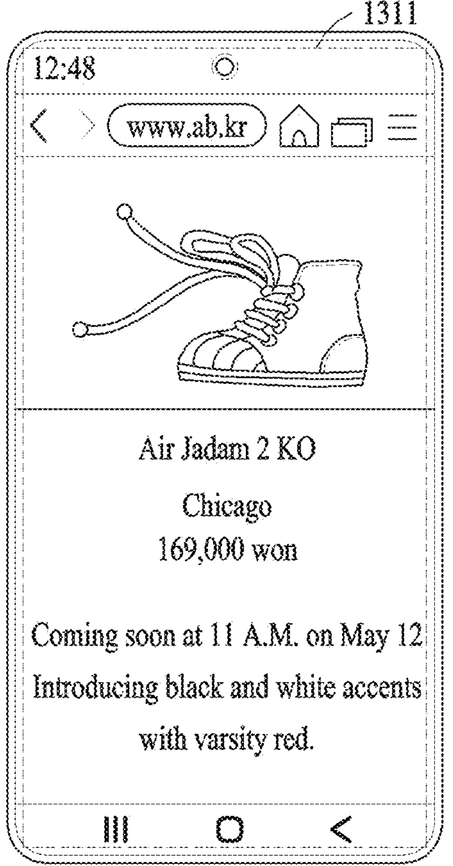
FIG. 13 is a diagram illustrating an operation of identifying information from first content based on a user input, according to an embodiment.
Figure 13:
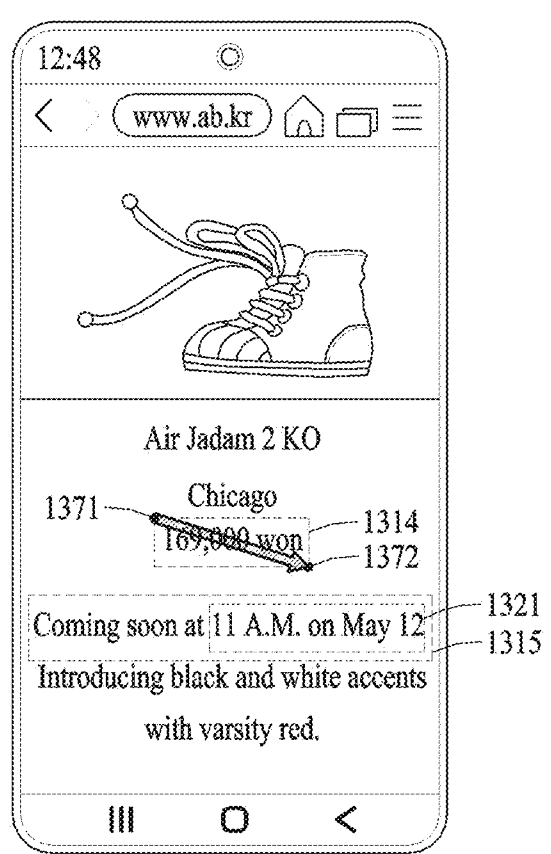

FIG. 13 is a diagram illustrating an operation of identifying information from first content based on a user input, according to an embodiment.

An electronic device (e.g., the electronic device 101 of FIG. 1) according to an embodiment may identify information from first content based on user input. The electronic device may determine a range for identifying information from the first content based on the user input. More particularly, in response to a partial area of a first area being designated based on the user input, the electronic device in a first shape may identify information, for example, only from partial content displayed in the designated partial area from the first content displayed in the first area. As a user may designate the range for identifying information from the first content, the electronic device may recognize text and identify information, for example, only within the range designated by the user, thereby increasing the text recognition rate of the electronic device and reducing computational workload of the electronic device.

As illustrated in FIG. 13, in response to partial areas 1314 and 1315 of a first area 1311 being designated based on a user input, the electronic device in the first shape may identify information, for example, only from partial content displayed in the designated partial areas 1314 and 1315 of first content displayed in the first area 1311. For example, the electronic device may designate the partial areas 1314 and 1315 by receiving a drag input from a user. The drag input may be input of clicking or touching a start point 1371 in the first area 1311, moving while maintaining the click or touch, and releasing the click or touch at an end point 1372. In another example, the electronic device may also designate the partial areas 1314 and 1315 by receiving a swipe input. Areas in which a swipe input occurs may be determined as the partial areas 1314 and 1315 designated based on the user input. When information may not be identified in partial content (e.g., "169,000 won") displayed in the partial area 1314 designated based on the user input, the electronic device may not display a graphic object that may receive input for executing a second application. The electronic device may identify schedule information 1321 from partial content (e.g., "Coming soon at 11 A.M. on May 12") displayed in the partial area 1315 designated based on the user input and then may display, in the first area 1311, a graphic object that is capable of receiving input for executing a second application when there is a candidate application to which the identified schedule information 1321 may be applied.

Figure 14:
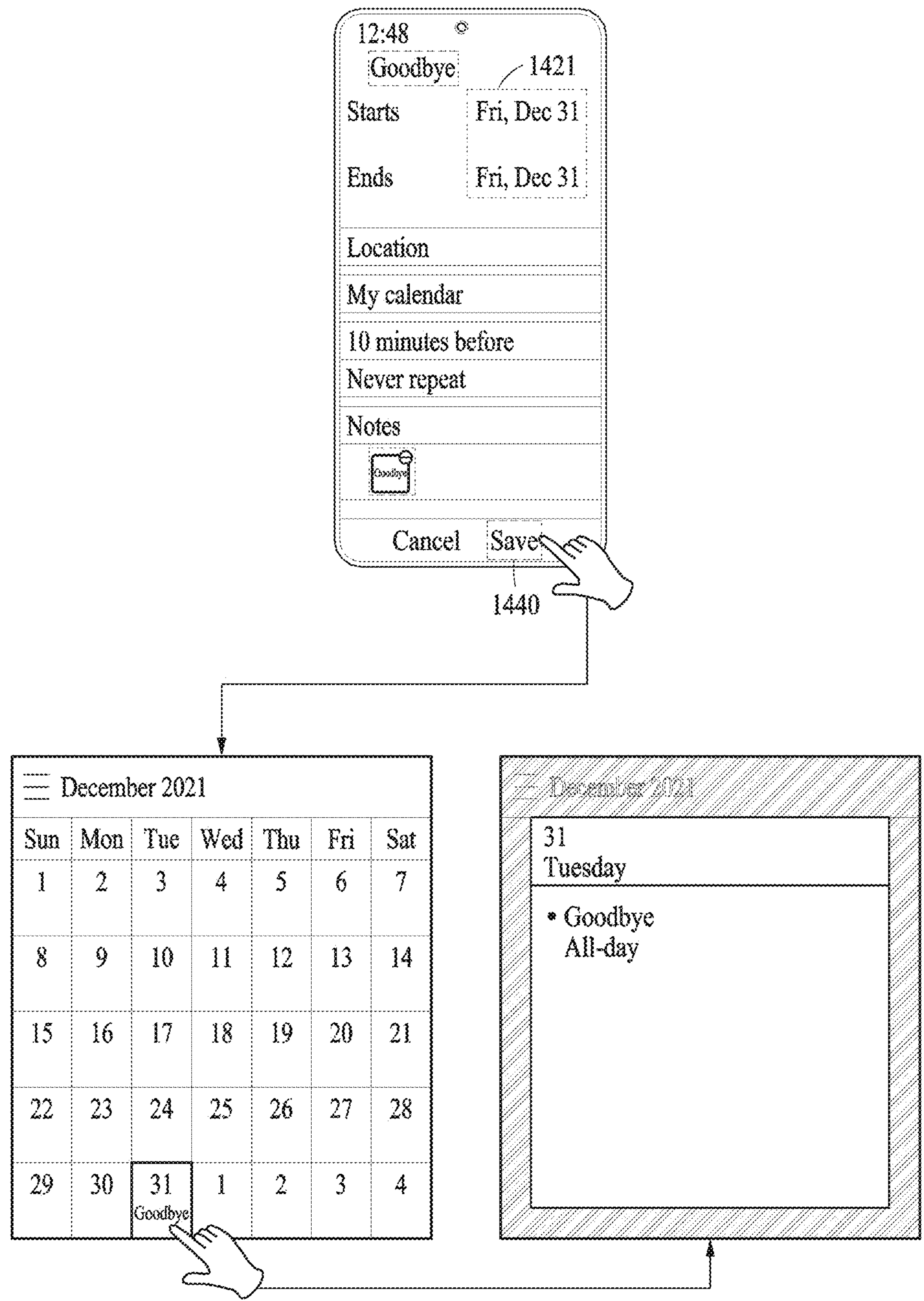
FIG. 14 is a diagram illustrating an application of identified information in the second application, according to an embodiment.

FIG. 14 is a diagram illustrating an application of identified information in the second application, according to an embodiment.

An electronic device (e.g., the electronic device 101 of FIG. 1) according to an embodiment may select a second application to which information identified in first content is applied. The electronic device may store in advance the identified information in a clipboard before receiving a user input selecting a graphic object (e.g., a first graphic object) that may receive input for executing the second application. A clipboard may be a space in the electronic device in which data may be stored temporarily. When information is identified in the first content, the electronic device may store in advance the identified information in the clipboard. In response to receiving the user input selecting the graphic object (e.g., the first graphic object), the electronic device may execute the second application to apply the identified information stored in the clipboard to the second application. In other words, the electronic device may store in advance the identified information in the clipboard and then control the identified information to be automatically input into the second application when the second application is executed. For example, as illustrated in FIG. 14, when identifying schedule information 1421 from first content, the electronic device may store in advance the identified schedule information 1421 in the clipboard. In response to receiving a user input selecting a graphic object, the electronic device may input the schedule information 1421 stored in the clipboard into a calendar application. Thereafter, whenever the electronic device receives a user input selecting an object 1440 for adding an event to the second application, the electronic device may add the schedule information 1421 to the calendar application.

Figure 15:
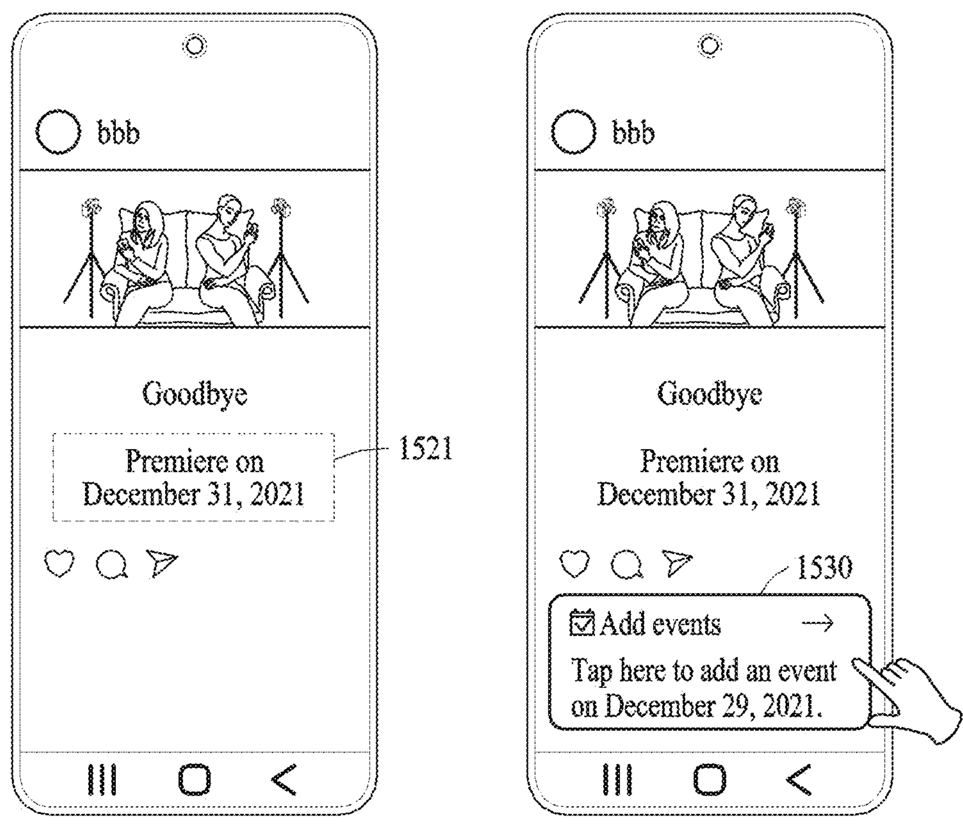
FIG. 15 is a diagram illustrating an example of an operation in which an electronic device identifies schedule information in first content, according to an embodiment.

FIG. 15 is a diagram illustrating an example of an operation in which an electronic device identifies schedule information in first content, according to an embodiment.

An electronic device (e.g., the electronic device 101 of FIG. 1) according to an embodiment may identify schedule information 1521 from text recognized in first content. The electronic device may identify the schedule information 1521 by identifying date-related information or time-related information from text. For example, the date-related information may be identified by determining whether text indicating dates, such as "YYYY-MM-DD", "DD-MM-YYYY", "MM.DD.YYYY", or the like, is identified from text recognized in first content. In another example, the time-related information may be identified by determining whether text indicating time, such as "Ends HH:MM", "HH:MM-HH:MM", or the like, is identified from text recognized in the first content. When the electronic device identifies the schedule information 1521 in the first content and there is at least one candidate application to which the schedule information 1521 may be applied, the electronic device may display, in a first area, a graphic object 1530 that is capable of receiving input for executing a second application, to which the schedule information 1521 is applied, among the at least one candidate application. When receiving a user input selecting the graphic object 1530, the electronic device may execute the second application (e.g., a calendar application or an alarm application) to which the schedule information 1521 is applied to apply the identified schedule information 1521 to the second application.

Furthermore, the electronic device may identify location information from text recognized from the first content. For example, when three or more pieces of location-related information, such as city, county, district, neighborhood, town, village, building number, building, unit number, and floor, are recognized from the text recognized from the first content, these recognized pieces of information may be determined as location information.

Figure 16:
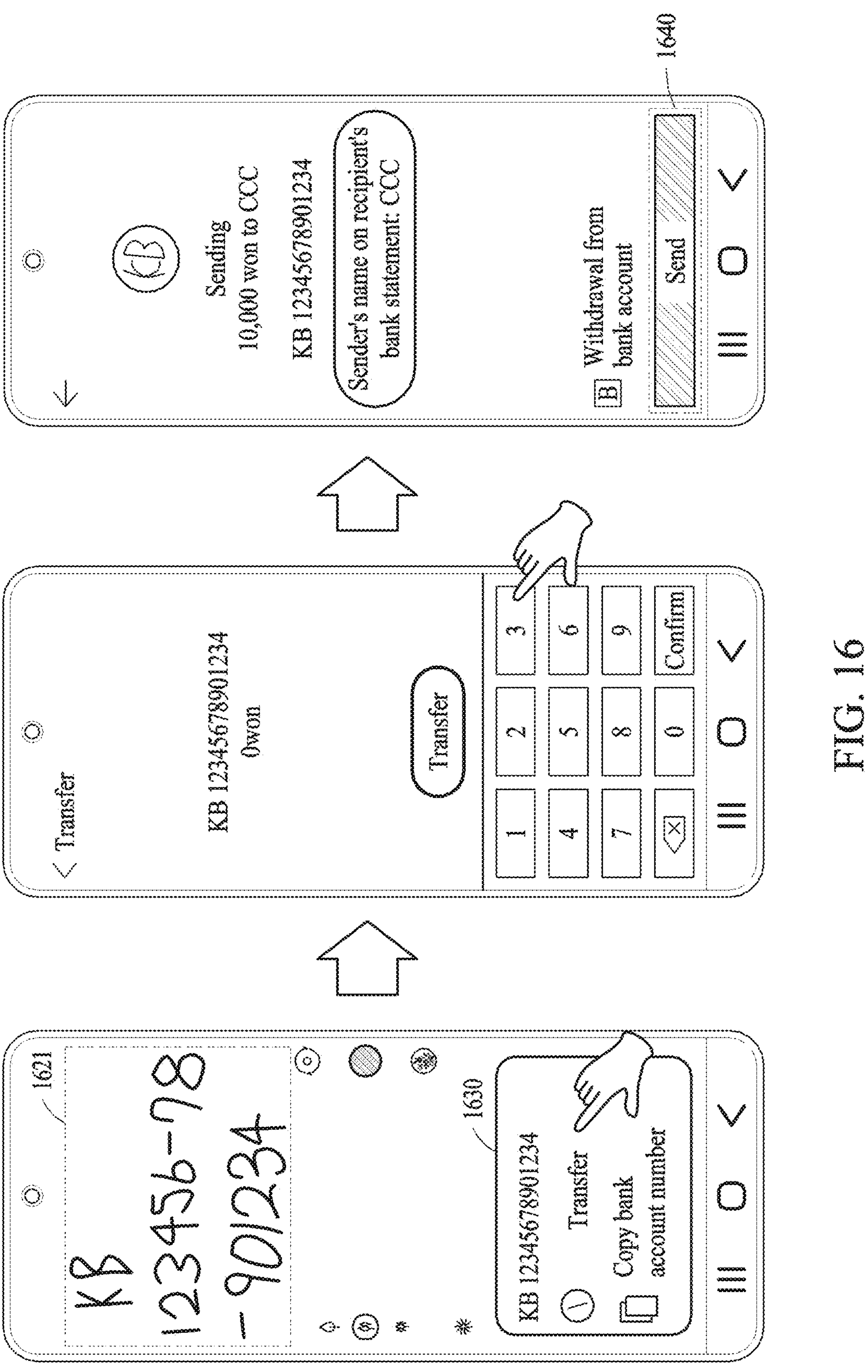
FIGS. 16 and 17 are diagrams illustrating an operation in which an electronic device identifies bank account number information in first content, according to an embodiment.
Figure 17:
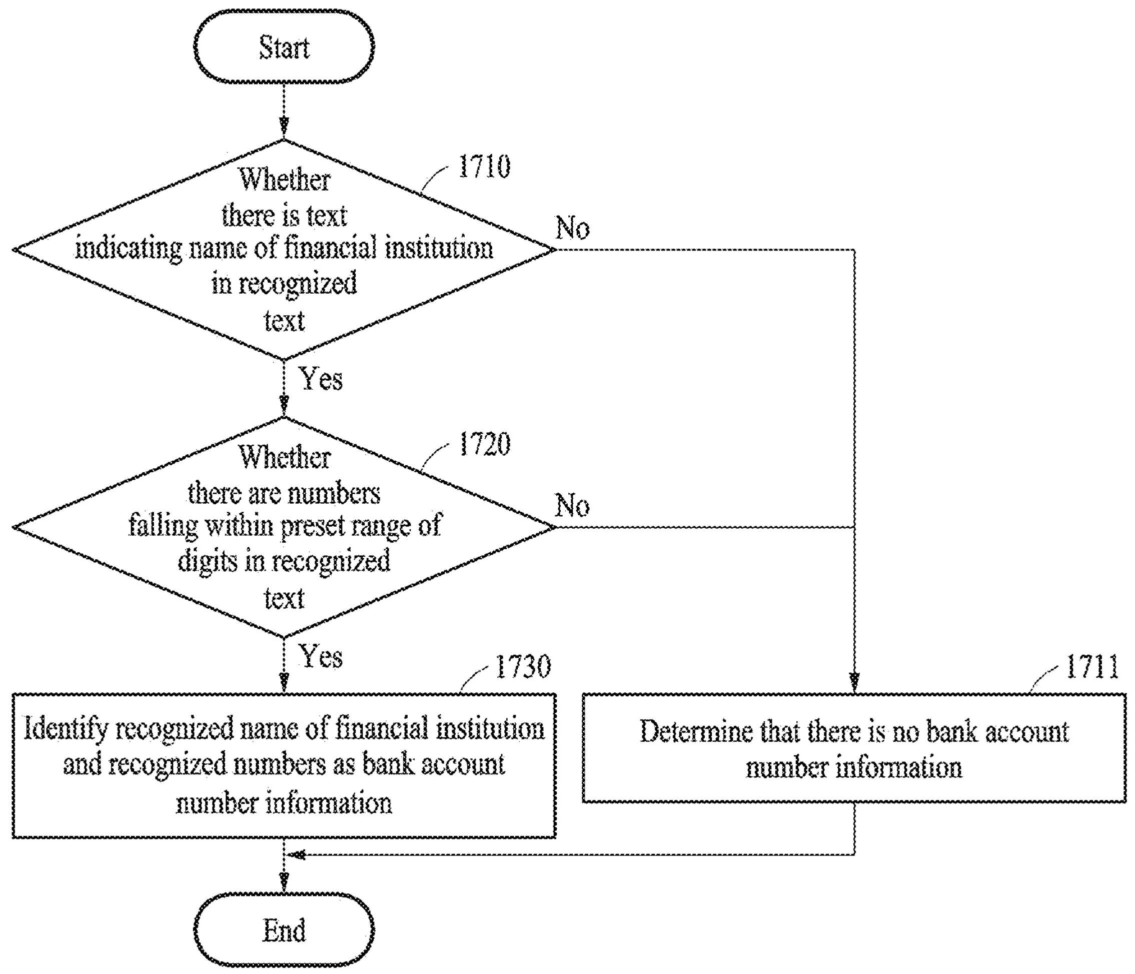

FIGS. 16 and 17 are diagrams illustrating an operation in which an electronic device identifies bank account number information in first content, according to an embodiment.

An electronic device (e.g., the electronic device 101 of FIG. 1) according to an embodiment may identify bank account number-related information 1621 (hereinafter, referred to as bank account number information) from text recognized in first content. An operation in which the electronic device identifies the bank account number information 1621 is described with reference to FIG. 17. In operation 1710, the electronic device may recognize text in first content and determine whether there is text indicating the name of a financial institution in the recognized text. In operation 1711, when there is no text indicating the name of a financial institution in the text recognized in the first content, the electronic device may determine that there is no bank account number information in the first content. In operation 1720, the electronic device may determine whether there are numbers falling within a preset range of digits in the text recognized in the first content. For example, a preset range of digits may be between 8 and 16 digits. In operation 1730, the electronic device may identify, as the bank account number information 1621, the name of a financial institution and numbers falling within the preset range of digits identified from the text recognized in the first content.

Referring back to FIG. 16, the electronic device may identify the bank account number information 1621 from the text recognized in the first content. When there is at least one candidate application to which the bank account number information 1621 may be applied, the electronic device may display, in a first area, a graphic object 1630 for receiving input for executing a second application, to which the bank account number information 1621 is applied, among the at least one candidate application. When receiving a user input selecting the graphic object 1630, the electronic device may execute the second application (e.g., a financial application or a bank application) to which the bank account number information 1621 is applied to automatically apply the identified bank account number information 1621 to the second application.

The electronic device may automatically apply the identified information to the second application but may not automatically perform an operation that requires a user input in the second application. For example, when applying the bank account number information 1621 to a financial application, the electronic device may automatically perform an operation of inputting the bank account number information 1621 to the financial application. However, the electronic device may not automatically perform an operation of performing a wire transfer without a user input because the operation of performing a wire transfer may require a user input. In other words, when applying the bank account number information 1621 to the financial application, the electronic device may not automatically perform a wire transfer. However, when the electronic device receives a user input selecting an object 1640 indicating the command to perform a wire transfer in the financial application, the electronic device may perform a wire transfer.

Figure 18:
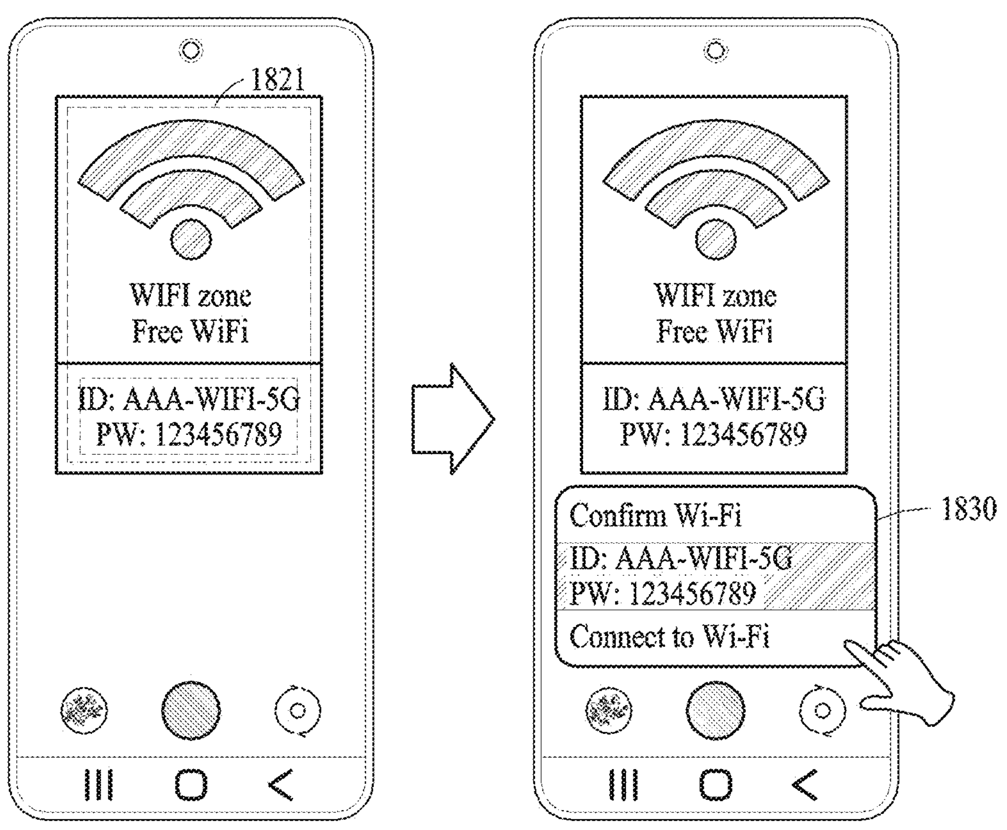
FIGS. 18 and 19 are diagrams illustrating examples of an operation in which an electronic device identifies wireless-fidelity (Wi-Fi)-related information, according to an embodiment.
Figure 19:
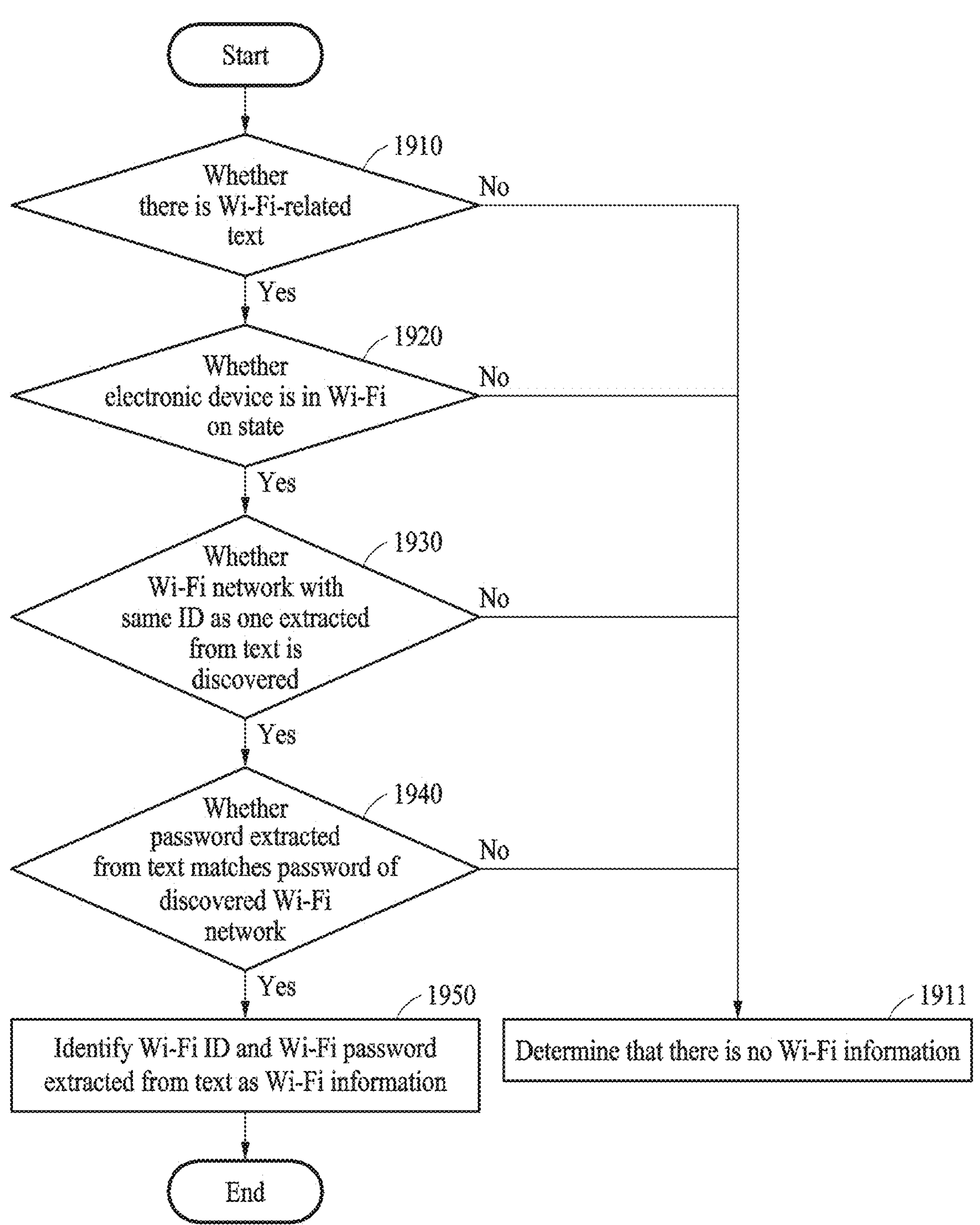

FIGS. 18 and 19 are diagrams illustrating examples of an operation in which an electronic device identifies Wi-Fi-related information, according to an embodiment.

An electronic device (e.g., the electronic device 101 of FIG. 1) according to an embodiment may identify Wi-Fi-related information 1821 (hereinafter, referred to as Wi-Fi information) from text recognized in first content. An operation in which the electronic device identifies the Wi-Fi information 1821 is described with reference to FIG. 19. In operation 1910, the electronic device may recognize text in the first content and determine whether there is Wi-Fi-related text among the recognized text. In operation 1911, when there is no Wi-Fi-related text among the text recognized in the first content, the electronic device may determine that there is no Wi-Fi information. In operation 1920, the electronic device may determine whether the electronic device is in a Wi-Fi on state. The Wi-Fi on state may be a state in which the electronic device searches for a wireless local area network (WLAN) to which the electronic device is connected. In operation 1930, when in the Wi-Fi on state, the electronic device may determine whether a Wi-Fi network with the same identification (ID) as the one extracted from Wi-Fi-related text is discovered. When a Wi-Fi network with the same ID as the one extracted from the Wi-Fi related text is included in discovered Wi-Fi networks, the electronic device may access the Wi-Fi network with the same ID as the one extracted from the Wi-Fi related text. In operation 1940, the electronic device may determine whether a password extracted from the Wi-Fi-related text matches the password of the Wi-Fi network with the same ID as the one extracted from the Wi-Fi related text. In operation 1950, when the password of the Wi-Fi network with the same ID as the one extracted from the Wi-Fi related text matches the password extracted from the Wi-Fi-related text, the electronic device may identify the ID and password extracted from the Wi-Fi-related text as the Wi-Fi information 1821.

Referring back to FIG. 18, the electronic device may identify the Wi-Fi information 1821 from the Wi-Fi-related text recognized in the first content. When there is at least one candidate application to which the Wi-Fi information 1821 may be applied, the electronic device may display, in a first area, a graphic object 1830 that is capable of receiving input for executing a second application, to which the Wi-Fi information 1821 is applied, among the at least one candidate application. When receiving a user input selecting the graphic object 1830, the electronic device may join a Wi-Fi network using the Wi-Fi information 1821.

Figure 20:
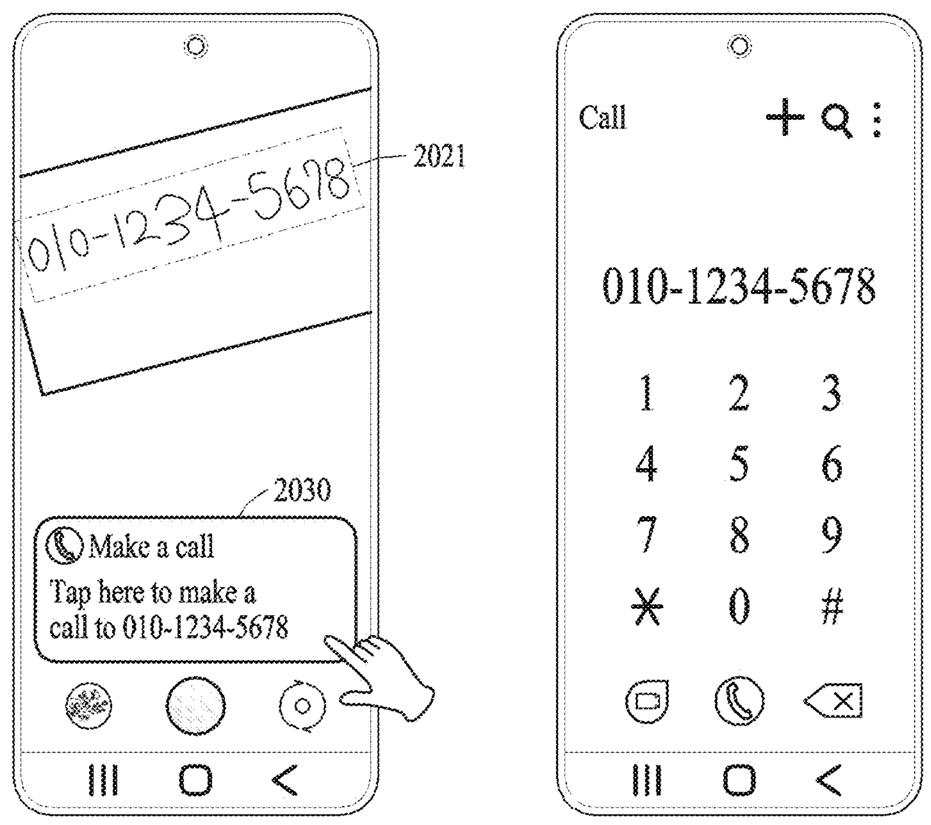
FIG. 20 is a diagram illustrating an example of an operation in which an electronic device identifies phone number-related information, according to an embodiment.

FIG. 20 is a diagram illustrating an example of an operation in which an electronic device identifies phone number-related information, according to an embodiment.

An electronic device (e.g., the electronic device 101 of FIG. 1) according to an embodiment may identify phone number-related information 2021 (hereinafter, referred to as phone number information) from text recognized in first content. For example, phone number-related information 2021 may be identified by determining whether numbers that are assumed to be a phone number are identified from the text recognized in the first content. When identifying the phone number information 2021 from the first content, the electronic device may display, in a first area, a graphic object 2030 that is capable of receiving input for executing a second application (e.g., a phone calling application), to which the phone number information 2021 is applied, among at least one candidate application. When the electronic device receives a user input selecting the graphic object 2030, second content displaying the phone number information 2021 applied to a phone calling application may be displayed on the screen of the electronic device. For example, as illustrated in FIG. 20, the second content may be content displaying a phone number corresponding to the phone number information 2021 input to a phone calling application.

According to an embodiment, an electronic device that is transformable may include a display module including a first area and a second area, wherein the first area is activated when the shape of the electronic device is a first shape and the second area is activated when the shape of the electronic device is a second shape, a processor; and a memory connected electrically to the processor and configured to store computer-readable instructions executable by the processor, wherein the computer-readable instructions, when executed, cause the electronic device to, in response to the electronic device being in the first shape, display first content related to a first application in the first area, identify information from the first content, determine whether there is at least one candidate application to which the identified information is applicable, and in response to determining that there is the at least one candidate application to which the identified information is applicable, display, in the first area, a first graphic object that is capable of receiving input for changing the shape of the electronic device from the first shape to the second shape.

The computer-readable instructions, when executed by the processor, cause the electronic device to, in response to an occurrence of an event, identify the information from the first content that is identified corresponding to the occurring event.

The computer-readable instructions, when executed by the processor, cause the electronic device to, in response to determining that there is the at least one candidate application to which the identified information is applicable, select a candidate application, to which the identified information is applied, from among the at least one candidate application as a second application.

The computer-readable instructions, when executed by the processor, cause the electronic device to, in response to a candidate application to which the identified information is applied being preset, select the preset candidate application as the second application and, in response to a candidate application to which the identified information is applied not being preset, display, in the first area, at least one icon indicating the at least one candidate application and select, based on a user input selecting one icon from among the at least one icon, a candidate application indicated by the one icon as the second application.

The computer-readable instructions, when executed by the processor, cause the electronic device to, in response to a user input selecting the first graphic object being received and the shape of the electronic device being changed from the first shape to the second shape, display, in the second area, at least a portion of second content related to the second application.

The computer-readable instructions, when executed by the processor, cause the electronic device to display the first graphic object in the first area for a preset time and remove a display of the first graphic object when the preset time elapses.

The computer-readable instructions, when executed by the processor, cause the electronic device to determine an area to display the second content based on a user input within a whole screen area shown in response to the shape of the electronic device being changed to the second shape.

The computer-readable instructions, when executed by the processor, cause the electronic device to, while the electronic device is maintained in the first shape, display a second graphic object or a third graphic object in the first area, wherein the second graphic object is capable of receiving input for displaying the second content related to the second application in one area divided from the first area and the third graphic object is capable of receiving input for executing the second application only in the background.

The computer-readable instructions, when executed by the processor, cause the electronic device to, in response to receiving user input selecting the second graphic object, display at least a portion of the second content in the first area and, in response to receiving a user input selecting the third graphic object, execute the second application in the background to apply the identified information to the second application.

The computer-readable instructions, when executed by the processor, cause the electronic device to, in response to the electronic device being in the first shape, in response to a partial area of the first area being designated based on a user input, identify the information only from partial content displayed in the designated partial area of the first content displayed in the first area.

The computer-readable instructions, when executed by the processor, cause the electronic device to, in response to the information being identified in the first content, store the identified information in a clipboard and, in response to receiving a user input selecting the first graphic object, automatically apply the identified information stored in the clipboard to the second application.

A method, implemented by a processor, may include activating a first area in response to the shape of an electronic device being a first shape and activating a second area in response to the shape of the electronic device being a second shape, in response to the electronic device being in the first shape, displaying first content related to a first application in the first area, identifying information from the first content, determining whether there is at least one candidate application to which the identified information is applicable, and in response to determining that there is the at least one candidate application to which the identified information is applicable, displaying, in the first area, a first graphic object that is capable of receiving input for changing the shape of the electronic device from the first shape to the second shape.

The identifying of the information from the first content may include identifying, in response to an occurrence of an event, the information in the first content that is identified corresponding to the occurring event.

According to an embodiment, the method implemented by the processor may further include, in response to there being the at least one candidate application, selecting a candidate application to which the identified information is applied as a second application from among the at least one candidate application.

The selecting of the candidate application to which the identified information is applied as the second application may include, in response to the candidate application to which the identified information is applied being preset, selecting the preset candidate application as a second application and, in response to a candidate application to which the identified information is applied not being preset, displaying, in the first area, at least one icon indicating the at least one candidate application and, based on a user input selecting one icon from among the at least one icon, selecting a candidate application indicated by the one icon as the second application.

According to an embodiment, the method implemented by the processor may further include, in response to a user input selecting the first graphic object is received and the shape of the electronic device is changed from the first shape to the second shape, displaying, in the second area, at least a portion of second content related to the second application.

The displaying of the first graphic object in the first area may include displaying the first graphic object in the first area for a preset time and removing a display of the first graphic object when the preset time elapses.

According to an embodiment, the method implemented by the processor may further include, while the electronic device is maintained in the first shape, displaying a second graphic object or a third graphic object in the first area, wherein the second graphic object is capable of receiving input for displaying the second content related to the second application in one area divided from the first area and the third graphic object is capable of receiving input for executing the second application only in the background.

According to an embodiment, the method implemented by the processor may further include, in response to receiving a user input selecting the second graphic object, displaying at least a portion of the second content in the first area and, in response to receiving a user input selecting the third graphic object, executing the second application in the background to apply the identified information to the second application.

The identifying of the information from the first content may include, in response to the electronic device being in the first shape, in response to a partial area of the first area being designated based on user input, identifying the information only from partial content displayed in the designated partial area of the first content displayed in the first area.

What is claimed is:

1. An electronic device that is transformable, comprising:

a display comprising a first area and a second area, wherein the first area is displayable when the electronic device is in a first shape and the second area is additionally displayable when the electronic device is in a second shape;

at least one processor; and memory electrically connected to the at least one processor and configured to store instructions, wherein the instructions, when executed by at least one processor, cause the electronic device to:

when the electronic device is in the first shape, display first content related to a first application in the first area of the display;

identify information from the first content displayed in the first area;

determine whether there is at least one candidate application to which the identified information is applicable; and in response to determining that there is the at least one candidate application to which the identified information is applicable, display, in the first area, a first graphic object configured to receive a user input for changing the shape of the electronic device from the first shape to the second shape.

2. The electronic device of claim 1, wherein—the computer-readable instructions, when executed by the processor, cause the electronic device to, in response to an occurrence of an event, identify the information from the first content that is identified corresponding to the occurring event.

3. The electronic device of one of claim 1, wherein the computer-readable instructions, when executed by the processor, cause the electronic device to, in response to determining that there is the at least one candidate application to which the identified information is applicable, select a candidate application, to which the identified information is applied, from among the at least one candidate application as a second application.

4. The electronic device of one of claim 1, wherein the computer-readable instructions, when executed by the processor, cause the electronic device to:

in response to a candidate application to which the identified information is applied being preset, select the preset candidate application as the second application; and in response to a candidate application to which the identified information is applied not being preset, display, in the first area, at least one icon indicating the at least one candidate application and select, based on a user input selecting one icon from among the at least one icon, a candidate application indicated by the one icon as the second application.

5. The electronic device of one of claim 1, wherein the computer-readable instructions, when executed by the processor, cause the electronic device to, in response to a user input selecting the first graphic object being received and the shape of the electronic device being changed from the first shape to the second shape, display, in the second area, at least a portion of second content related to the second application.

6. The electronic device of one of claim 1, wherein the computer-readable instructions, when executed by the processor, cause the electronic device to display the first graphic object in the first area for a preset time and remove a display of the first graphic object when the preset time elapses.

7. The electronic device of one of claim 1, wherein the computer-readable instructions, when executed by the processor, cause the electronic device to determine an area to display the second content based on a user input within a whole screen area shown in response to the shape of the electronic device being changed to the second shape.

8. The electronic device of one of claim 1, wherein the computer-readable instructions, when executed by the processor, cause the electronic device to, while the electronic device is maintained in the first shape, display a second graphic object or a third graphic object in the first area, wherein the second graphic object is capable of receiving input for displaying the second content related to the second application in one area divided from the first area and the third graphic object is capable of receiving input for executing the second application only in a background.

9. The electronic device of one of claim 1, wherein the computer-readable instructions, when executed by the processor, cause the electronic device to:

in response to receiving a user input selecting the second graphic object, display at least a portion of the second content in the first area; and in response to receiving a user input selecting the third graphic object, execute the second application in the background to apply the identified information to the second application.

10. The electronic device of one of claim 1, wherein the computer-readable instructions, when executed by the processor, cause the electronic device to, in response to the electronic device being in the first shape, in response to a partial area of the first area being designated based on a user input, identify the information only from partial content displayed in the designated partial area of the first content displayed in the first area.

11. The electronic device of one of claim 1, wherein the computer-readable instructions, when executed by the processor, cause the electronic device to:

in response to the information being identified in the first content, store the identified information in a clipboard; and in response to receiving a user input selecting the first graphic object, automatically apply the identified information stored in the clipboard to the second application.

12. A method, implemented by a processor, comprising:

when the electronic device is in a first shape, displaying first content related to a first application in a first area of a display, wherein the display comprising the first area and a second area, wherein the first area is displayable when the electronic device is in the first shape and the second area is additionally displayable when the electronic device is in a second shape;

identifying information from the first content displayed in the first area;

determining whether there is at least one candidate application to which the identified information is applicable; and in response to determining that there is the at least one candidate application to which the identified information is applicable, displaying, in the first area, a first graphic object configured to receive a user input for changing the shape of the electronic device from the first shape to the second shape.

13. The method of claim 12, further comprising:

in response to a candidate application to which the identified information is applied being preset, selecting the preset candidate application as a second application to which the identified information is applied; and in response to a candidate application to which the identified information is applied not being preset, displaying, in the first area, at least one icon indicating the at least one candidate application and, based on a user input selecting one icon from among the at least one icon, selecting a candidate application indicated by the one icon as the second application.

14. The method of claim 13, further comprising:

in response to a user input selecting the first graphic object being received and the shape of the electronic device being changed from the first shape to the second shape, displaying, in the second area, at least a portion of second content related to the second application.

15. The method of one of claim 13, further comprising:

while the electronic device is maintained in the first shape, displaying a second graphic object or a third graphic object in the first area, wherein the second graphic object is capable of receiving input for displaying the second content related to the second application in one area divided from the first area and the third graphic object is capable of receiving input for executing the second application only in a background.

* * * * *